(12) United States Patent
Pon et al.

(10) Patent No.: US 12,019,167 B2
(45) Date of Patent: Jun. 25, 2024

(54) DETERMINING MULTIPATH IN A POSITIONING SYSTEM

(71) Applicant: QUALCOMM Incorporated, San Diego, CA (US)

(72) Inventors: Rayman Wai Pon, Cupertino, CA (US); Pranav Iyengar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 17/486,366

(22) Filed: Sep. 27, 2021

(65) Prior Publication Data

US 2023/0096975 A1 Mar. 30, 2023

(51) Int. Cl.
G01S 19/22 (2010.01)
G01S 19/42 (2010.01)
G01S 19/47 (2010.01)

(52) U.S. Cl.
CPC ............ *G01S 19/22* (2013.01); *G01S 19/428* (2013.01); *G01S 19/47* (2013.01)

(58) Field of Classification Search
CPC ......... G01S 19/22; G01S 19/47; G01S 19/428
USPC ...................................................... 455/456.1
See application file for complete search history.

(56) References Cited

U.S. PATENT DOCUMENTS

| 6,356,771 B1 | 3/2002 | Dent |
| 6,442,371 B1 | 8/2002 | Lyu |
| 6,609,013 B1 | 8/2003 | Oh et al. |
| 6,778,843 B2 | 8/2004 | Oura |

(Continued)

FOREIGN PATENT DOCUMENTS

| EP | 1198078 A2 | 4/2002 |
| EP | 1491910 A1 | 12/2004 |

(Continued)

OTHER PUBLICATIONS

International Search Report and Written Opinion—PCT/US2022/075134—ISA/EPO—dated Feb. 21, 2023.

(Continued)

*Primary Examiner* — Joel Ajayi
(74) *Attorney, Agent, or Firm* — Weaver Austin Villeneuve & Sampson LLP/QUALCOMM

(57) ABSTRACT

Methods, systems, computer-readable media, and apparatuses for determination of multipath for determining a location of user equipment (UE) are presented. In some embodiments, the UE may, based on a first indication of signal strength associated with a first polarization type, and a second indication of signal strength associated with a second polarization type, determine an indication of multipath reflection along a path of signal propagation between a space vehicle (e.g., GNSS satellite) and the UE. Circularly polarized positioning signals may be received by the UE via natively present linearly polarized antennas and converted into circularly polarized signals. Converted circularly polarized signals may include right-handed and left-handed components, and signal strengths for each component may be compared to determine the presence of multipath. Positioning signals may be given a weight or disregarded based on the multipath determination when determining the position of the UE.

26 Claims, 17 Drawing Sheets

(56) References Cited

U.S. PATENT DOCUMENTS

| | | |
|---|---|---|
| 7,505,009 B2 | 3/2009 | Parsche et al. |
| 9,176,233 B2 | 11/2015 | Khalili et al. |
| 9,716,541 B2 | 7/2017 | Sanderovich et al. |
| 10,638,268 B2 | 4/2020 | Xing |
| 10,651,920 B1 | 5/2020 | Struhsaker et al. |
| 2002/0045427 A1 | 4/2002 | Lahti et al. |
| 2004/0029549 A1 | 2/2004 | Fikart |
| 2006/0087385 A1 | 4/2006 | Fitzpatrick et al. |
| 2012/0162012 A1 | 6/2012 | Marzouki et al. |
| 2014/0210678 A1 | 7/2014 | Chen et al. |
| 2016/0139271 A1 | 5/2016 | Chamseddine |
| 2016/0181704 A1 | 6/2016 | Orban et al. |
| 2017/0141471 A1 | 5/2017 | Taachouche et al. |
| 2017/0149294 A1 | 5/2017 | Wight et al. |
| 2017/0254901 A1 | 9/2017 | Kim |
| 2017/0317402 A1 | 11/2017 | Hwang et al. |
| 2018/0331714 A1 | 11/2018 | See et al. |
| 2019/0319342 A1 | 10/2019 | Apostolos et al. |
| 2020/0229010 A1 | 7/2020 | Soriaga et al. |
| 2020/0388923 A1 | 12/2020 | Leung et al. |
| 2021/0282097 A1 | 9/2021 | Imana et al. |
| 2022/0291395 A1 | 9/2022 | Iyengar et al. |
| 2022/0393761 A1 | 12/2022 | Comin et al. |
| 2023/0057434 A1* | 2/2023 | Lim .................. H01Q 21/065 |

FOREIGN PATENT DOCUMENTS

| | | |
|---|---|---|
| EP | 2608316 A1 | 6/2013 |
| EP | 3217477 | 9/2017 |
| EP | 3842837 A2 | 6/2021 |
| JP | H07254816 | 10/1995 |

OTHER PUBLICATIONS

Anaren Xinger, "Ultra Low Profile 0805 3 dB, 90° Hybrid Coupler", Model C0727J5003AHF, Rev. B., http://www.anaren.com, 5 pages.

Mahmoud Moubadir, et al. "A new circular polarization dual feed microstrip square patch antenna using branch coupler feeds for WLAN/HIPERLAN applications", Procedia Manufacturing 32, Apr. 2019, pp. 702-709.

Partial International Search Report—PCT/US2022/075134—ISA/EPO—dated Jan. 4, 2023.

\* cited by examiner

| Condition | RHCP | LHCP | LV/LH | Comments |
|---|---|---|---|---|
| LOS signal, no reflections | 0 | -30 | -3 | LOS, no reflections |
| LOS signal, w/low amplitude reflections | 0 | small | -3 | Some small amount of reflection, so small multipath errors on signal |
| LOS signal, w/large amplitude reflections | 0 | Large, near 0 | ~-3 | Large reflections, so large multipath errors on signal |
| NLOS only, Single reflection | -30 | 0 | -3 | Isolated tall buildings |
| NLOS only, odd reflections only | Small | 0 | ~-3 | Urban canyon |
| NLOS only, even reflections only | 0 | Small | ~-3 | Urban canyon |
| NLOS, w/random even/odd reflections | Small to large | Small to large | ~<-3 | Urban canyon |

FIG. 13

DETERMINING MULTIPATH IN A POSITIONING SYSTEM

BACKGROUND

1. Field of Disclosure

Aspects of the present disclosure generally relate to the field of wireless communications, particularly satellite communications, and determination of one or more properties of a User Equipment (UE) using radio frequency (RF) signals.

2. Description of Related Technology

The determination of a position of a mobile UE in a wireless communication network, often referred to as "positioning" of the UE, may be performed using any of a variety of position-determining techniques.

One example of such techniques includes transmission of reference signals by one or more Transmission Reception Points (TRPs) of the wireless communication network, and the measurement of these reference signals by the UE. These measurements can be indicative of distances and/or angles between the UE and one or more TRPs, enabling the position of the UE to be determined using multiangulation, multilateration (e.g., trilateration), and/or other geospatial or geometric (e.g., geodetic or geocentric) techniques.

The position determination of a UE often uses multiple measurements involving multiple reference signals. And each reference signal may be identified uniquely by both the network and UE. Reference signals are typically part of a large hierarchical structure and may require a large amount of signaling overhead to uniquely identify.

Other positioning techniques involving signal strength and/or other network parameters (as discussed elsewhere herein) may also be used alone or in conjunction with the foregoing techniques.

However, none of these techniques can fully and reliably eliminate positioning problems, in particular those caused by multipath propagation of radio signals. In radio communication, so-called multipath may refer to radio signals reaching a receiver (e.g., a receiving antenna located in a UE) by two or more paths. For example, a signal emitted from a space vehicle (SV), such as a satellite used in satellite navigation systems (e.g., a Global Navigation Satellite System (GNSS) such as the Global Positioning System (GPS), Galileo, etc.), may reflect off various surfaces near the globe's surface (e.g., natural environmental obstacles, walls of structures, doors, tunnels, roads) before reaching a UE. This propagation of the signal along two or more paths causes degradation of the signal from the SV, which may cause errors or delays in determining the location of a UE (or other receiver-equipped device) via one or more of the techniques described above.

In fact, multipath continues to remain a dominant source of errors in positioning. While multipath cannot be completely eliminated, given that there always exist locations without a direct line of sight from an SV, what is needed is a reliable way to indicate that a received positioning signal does or does not have multipath on it, and to what extent.

To these ends, solutions are described herein to, among other things, provide UEs an additional set of techniques to increase the detectability of multipath and thereby further optimize the reliability of positioning.

BRIEF SUMMARY

In one aspect of the present disclosure, a method for multipath estimation at a mobile device is disclosed. In some embodiments, the method includes: determining a first indication of signal strength associated with a first polarization type and derived from one or more signals received from a GNSS satellite using one or more antennas at the mobile device; determining a second indication of signal strength associated with a second polarization type and derived from the one or more signals received from the GNSS satellite using the one or more antennas at the mobile device; and based on the first indication of signal strength associated with the first polarization type and the second indication of signal strength associated with the second polarization type, determining an indication of multipath reflection along a path of signal propagation between the GNSS satellite and the mobile device.

In another aspect of the present disclosure, a user equipment is disclosed. In some embodiments, the user equipment includes a baseband subsystem; an antenna subsystem configured for signal communication with the baseband subsystem, the antenna subsystem comprising a first antenna, a second antenna, and a radio frequency (RF) coupler configured to receive signal inputs from the first antenna and the second antenna to output a signal having a first polarization type and a signal having a second polarization type; and a processor, communicatively connected to the baseband subsystem, the processor configured to: determine a first indication of signal strength associated with the first polarization type and derived from one or more signals received from a GNSS satellite using the antenna subsystem; determine a second indication of signal strength associated with the second polarization type and derived from the one or more signals received from the GNSS satellite using the antenna subsystem; and based on the first indication of signal strength associated with the first polarization type and the second indication of signal strength associated with the second polarization type, determine an indication of multipath reflection along a path of signal propagation between the GNSS satellite and the user equipment.

In another aspect of the present disclosure, a non-transitory computer-readable apparatus is disclosed. In some embodiments, the non-transitory computer-readable apparatus includes a storage medium, the storage medium including a plurality of instructions to, when executed by a processor, cause a mobile device to: determine a first indication of signal strength associated with a first polarization type and derived from one or more signals received from a GNSS satellite using one or more antennas at the mobile device; determine a second indication of signal strength associated with a second polarization type and derived from the one or more signals received from the GNSS satellite using the one or more antennas at the mobile device; and based on the first indication of signal strength associated with the first polarization type and the second indication of signal strength associated with the second polarization type, determine an indication of multipath reflection along a path of signal propagation between the GNSS satellite and the mobile device.

In another aspect of the present disclosure, a computerized apparatus is disclosed. In some embodiments, the computerized apparatus includes: means for determining a first indication of signal strength associated with a first polarization type and derived from one or more signals received from a GNSS satellite using one or more antennas; means for determining a second indication of signal strength associated with a second polarization type and derived from the one or more signals received from the GNSS satellite using the one or more antennas; and means for, based on the first indication of signal strength associated with the first polarization type and the second indication of signal strength associated with the second polarization type, determining an indication of multipath reflection along a path of signal propagation from the GNSS satellite.

BRIEF DESCRIPTION OF THE DRAWINGS

Aspects of the present disclosure are illustrated by way of example in the accompanying figures:

FIG. 13 is a table showing illustrative examples of determinations that may be made regarding multipath and classifications of environmental contexts based on right-handed and left-handed components of positioning signals.

DETAILED DESCRIPTION

Figure 1:
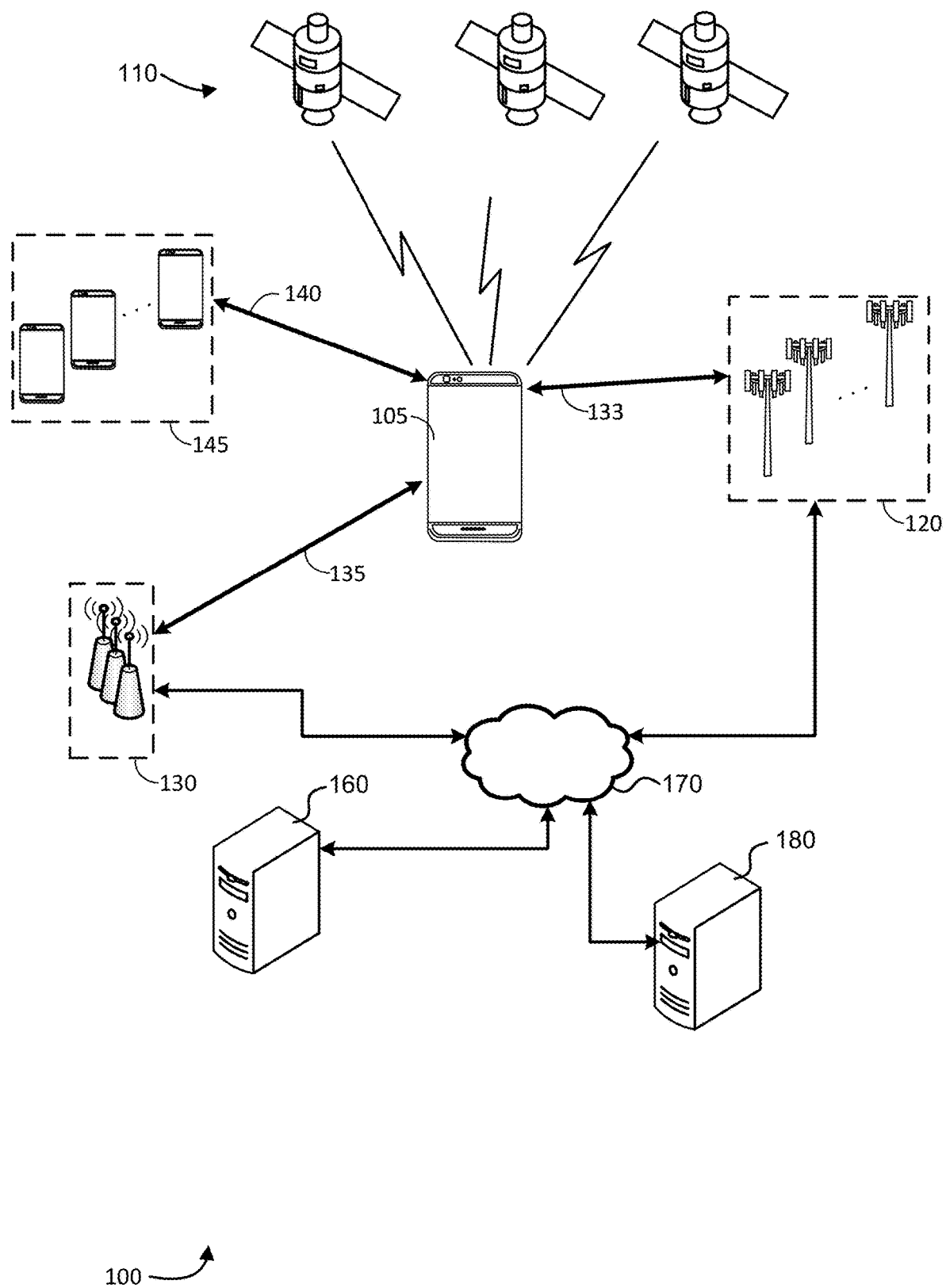
FIG. 1 illustrates a diagram of an embodiment of a positioning system that may be useful with one or more embodiments of the present disclosure.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

As discussed above, multipath propagation poses an issue for receiving positioning signals and determining a location of a UE. Additional details addressing multipath will follow an initial description of relevant systems and technologies.

FIG. 1 is a simplified illustration of a positioning system 100 in which a UE 105, location server 160, and/or other components of the positioning system 100 can use the techniques provided herein for determination and assessment of multipath for determining a location of the UE, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations (BS) 120 and access points (APs) 130 may be configured to be communicatively coupled to the network 170. In some embodiments, the base stations 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications — e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., BS 120 or AP 130) or some other location such as a location for UE 105 at some known previous time, or a location of another UE 145). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
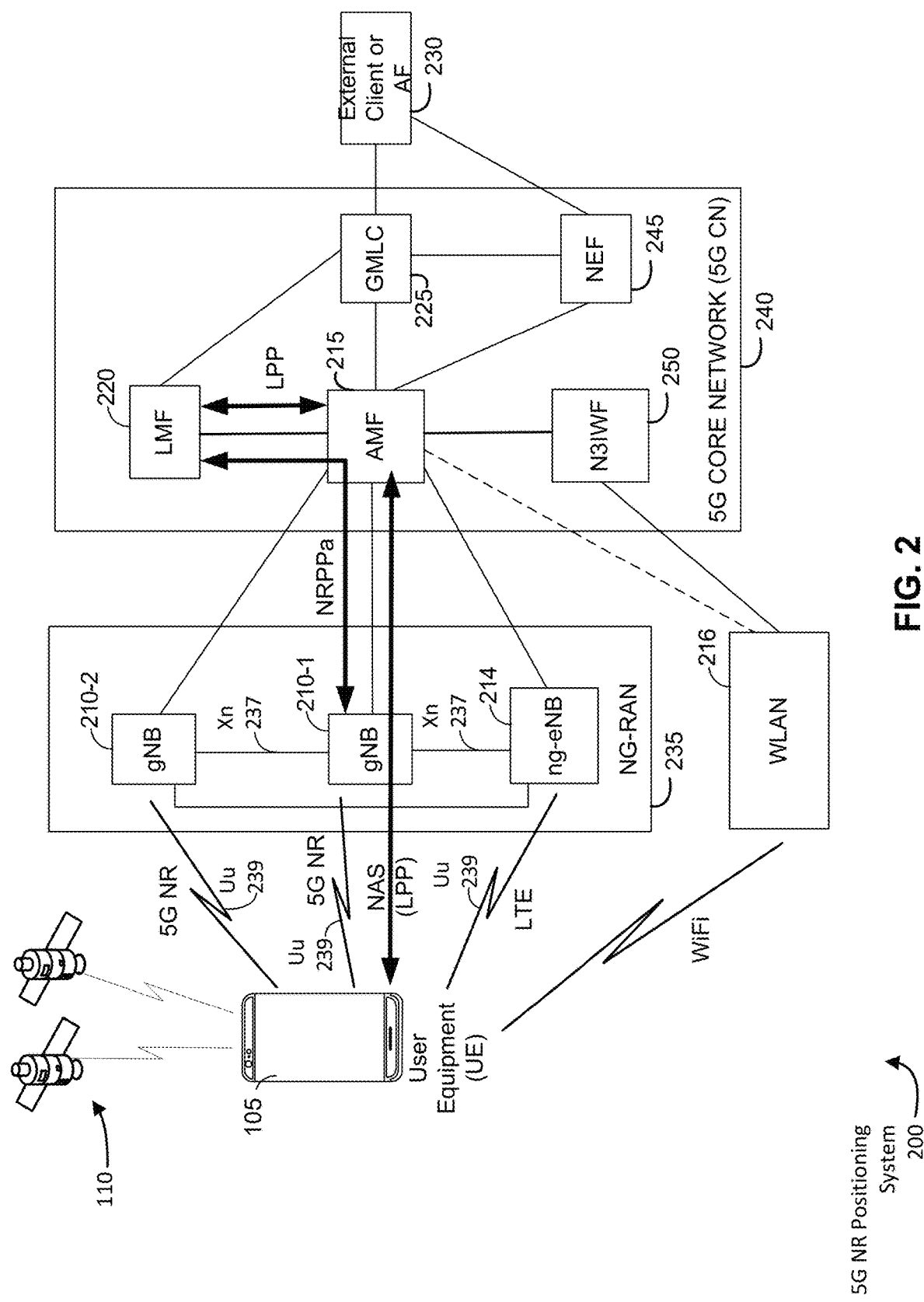
FIG. 2 illustrates a diagram of an embodiment of a positioning system (e.g., the positioning system of FIG. 1) implemented within a 5th Generation New Radio (5G NR) communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210 (which may be examples of base stations), ng-eNBs 214, Wireless Local Area Networks (WLANs) 216, Access and mobility Management Functions (AMFs) 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (e.g., gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (e.g., gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235, e.g., directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2 and/or another gNB not shown) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to SGCN 240 may occur if WLAN 216 is a trusted WLAN for SGCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes (e.g., gNBs 210, ng-eNB 214, and/or WLAN 216) providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to SGCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as SGCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in SGCN 240. The NEF 245 may support secure exposure of capabilities and events concerning SGCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Antenna and Baseband Configurations

In order to detect the presence of multipath on received positioning signals using existing antenna systems (e.g., UEs utilizing planar inverted F-shaped antenna (PIFA) components) and adjust according to embodiments described herein, the UE performs several actions: (1) Obtain positioning signals from one or more SVs. (2) Determine the dominant type of circular polarization of the positioning signals, i.e., whether right-handed circularly polarized (RHCP) or left-handed circularly polarized (LHCP). (3) Determine multipath based on the type of circular polarization and/or other information. (4) Infer the type of multipath environment the UE is located based on the determination of multipath, and adjust performance settings to, e.g., improve positioning.

In the subsequent discussions, various embodiments of an antenna subsystem and a baseband subsystem and their components will be described with respect to FIGS. 3-11. The antenna subsystem and the baseband subsystem may be used to, e.g., obtain positioning signals and determine the multipath.

Figure 3:
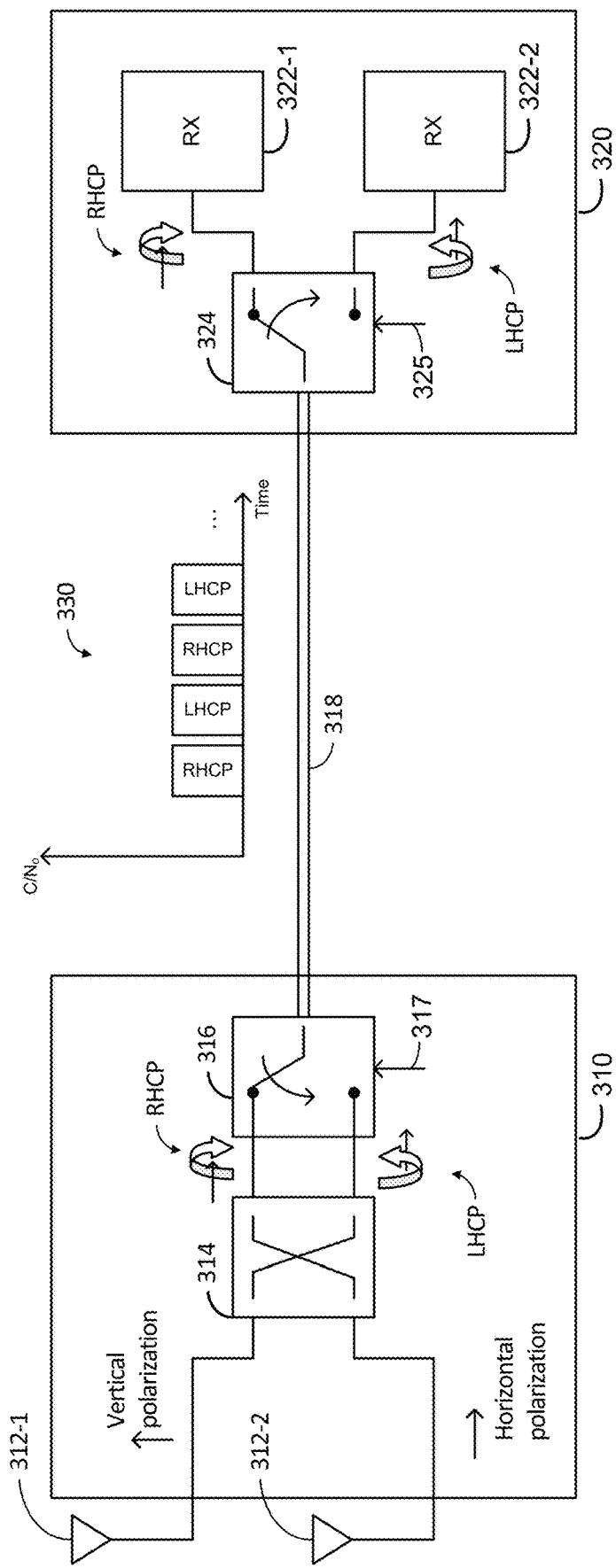
FIG. 3 illustrates a block diagram of a configuration of an antenna subsystem and a baseband subsystem of a wireless device, using an RF coupler and a single signal path to transmit time-multiplexed, circularly polarized signals from the antenna subsystem to the baseband subsystem, according to one embodiment.

FIG. 3 illustrates a block diagram of a configuration of an antenna subsystem 310 and a baseband subsystem 320 of a wireless device (e.g., a UE 105 as described above and elsewhere herein), according to an embodiment. In some embodiments, the antenna subsystem 310 and baseband subsystem 320 may be part of one or more transceivers configured to transmit and/or receive signals, including data signals and/or positioning signals.

In a variety of embodiments, the antenna subsystem 310 may include a plurality of receiving antennas, such as two antennas 312-1 and 312-2 (collectively referred to as antennas 312). In some embodiments, each of the antennas 312-1 and 312-2 may be configured to receive linearly polarized signals or signal components. In certain embodiments, each of the antennas 312-1 and 312-2 may be a planar inverted-F antenna (PIFA) type antenna.

As an aside, circular polarization refers to a polarization state in which an electromagnetic wave (e.g., an RF signal) is rotating (or appears to be rotating) by virtue of two phase-shifted perpendicular electromagnetic plane components, i.e., horizontal and vertical components, propagating at a constant magnitude and rate. Circularly polarized waves may have right-handed or left-handed polarization. RHCP signals refer to signals encompassed by right-handed polarized waves whose horizontal and vertical components are shifted by a 90-degree phase and whose vectors rotate clockwise relative to the direction of propagation of the wave. In contrast, LHCP signals are left-handed and have horizontal and vertical components that are shifted by −90 degrees, and rotate counterclockwise relative to the direction of propagation. RHCP and LHCP signals are not necessarily purely RHCP or LHCP, and may contain a dominant component.

One salient property of circularly polarized signals is that the "handedness" of the signal changes upon reflection from a surface. The extent to which the handedness changes depends on various factors such as the angle of incidence, type of material (e.g., opaqueness or transparency), shape of the surface, etc. For reflection at normal incidence (i.e., perpendicular to a flat surface such that the reflected wave returns back in the exact opposite direction), the polarization reverses completely. For instance, a purely RHCP signal would become characterized as purely LHCP. Practically speaking, signals would interact with surfaces at angles of incidence that vary greatly, may occur more than once, and usually would not be at normal incidence. Reflection may further cause polarization to become more elliptical. Hence, positioning signals are typically received with a mixture of polarization state components, with partly right-handed polarization and partly left-handed polarization. Often but not always, there is one dominant component, as will be discussed further with respect to FIG. 13.

If a circularly polarized positioning signal is transmitted from an SV with a known "handedness," detection of the handedness of the signal as received by an UE (thus indicating a change of handedness) may provide an indication of the existence and/or type of multipath channel experienced by the positioning signal as it travels from the SV to the UE. Positioning signals may also include data that support a position determination process. Such data may include, but is not limited to, the position of the SV, time of transmission, SV clock information, time information (e.g., relationship to UTC), and SV health information. With regard to the SV's position, this may be obtained in two forms: (i) so-called Almanac data, which provides a coarse, approximate position of the SV and (ii) so-called Ephemeris data, which provides a more precise position of the SV. The clocks of SV(s) (e.g., in a constellation) are highly accurate and synchronized with each other and to absolute time, allowing determination of distance based on the position and timing information as noted above. The clock of the local receiver (e.g., UE 105) is not synchronized to the SV(s), however, and the time of the local receiver clock and the unknown position of the receiver must be determined, e.g., using four SVs to derive a three-dimensional position for the receiver.

Referring back to FIG. 3, in some embodiments, each of the antennas 312 is configured to detect and receive RF signals of one type of linear polarization. For example, antenna 312-1 may be a PIFA configured to receive and/or detect signals or signal components having a vertical polarization, and antenna 312-2 may be a PIFA configured to receive and/or detect signals or signal components having a horizontal polarization. That is, the antenna subsystem 310 may be configured to detect separate linear components of a circularly polarized signal. Hence, when the UE antenna subsystem 310 receives a circularly polarized signal (e.g., RHCP signals from a GNSS satellite), the UE does not require dedicated RHCP or LHCP antennas. A received circularly polarized signal detected as linear components may be "reconstructed" using an RF coupler or combiner (as discussed below), and the UE 105 may thus advantageously (cost- and space-effectively) utilize existing antennas that are shared with other subsystems of the UE.

Depending on the multipath environment experienced by the received positioning signal, the signal will include some combination of right-handed (RHCP) component, left-handed (LHCP) component, and/or linear component. Using an antenna configuration where each type of polarization of the positioning signal can be obtained, characteristics (e.g., signal strength) of the signal at each polarization may be measured, and thereby estimate the probability of multipath on the signal. This information can then be used by a position determination process to weight and de-weight the SVs and/or the signals accordingly to yield a position result that is more accurate, precise, and reliable than existing positioning, as will be discussed in more detail with respect to FIG. 13.

However, it will be recognized that, in certain embodiments, dedicated antennas capable of detecting a particular circular polarization may alternatively or additionally be used in the antenna subsystem 310. For instance, one of the antennas (e.g., 312-1) of the antenna subsystem 310 may be configured to detect and receive RHCP signals, such as positioning signals transmitted from one or more SVs (e.g., GNSS satellites, noting that it is convention for GNSS satellites to emit RHCP positioning signals rather than LHCP positioning signals). The other one of the antennas (e.g., 312-2) may be configured to detect and receive left-hand circularly polarized (LHCP) signals. In these embodiments, RF coupler 314 may not be necessary.

In some embodiments, more than two antennas may be employed in any combination or fashion configured to receive linearly polarized, RHCP and/or LHCP signals. As but one example, a UE 105 may have three antennas 312, where two of the antennas 312 are configured to receive vertical and horizontal signals, respectively, and one of the antennas 312 is configured to receive RHCP signals. The RHCP antenna may be redundantly used to confirm the presence of RHCP signals for use cases requiring positioning accuracy and precision, e.g., drone navigation. In another embodiment, an antenna 312 may be configured to receive elliptically polarized signals. In another embodiment, a UE 105 may have multiple antenna subsystems each having one or more antennas.

The antenna subsystem 310 may include an RF coupler 314 that is configured to receive and combine inputs from the two antennas 312 into an output signal having a different polarization type. In some embodiments, the RF coupler 314 may be a 90-degree hybrid coupler, configured to receive two input signals (e.g., vertically polarized and horizontally polarized) and output combined phase-shifted signals. For example, linearly polarized components obtained via the antennas 312 may be combined into circularly polarized signals, e.g., RHCP or LHCP signals.

The antenna subsystem 310 may further include a switch 316 that receives and transmits one type of circularly polarized signal at a time. The output of the RF coupler 314 may be transmitted to and received by the switch 316. In one embodiment, the RF coupler 314 may include a switch in lieu of a separate switch (e.g., 316). The switch 316 may be toggled based on control signals 317. In some embodiments, the baseband subsystem 320 may generate the control signals 317 (and control signals 325, synchronized with control signals 317). In some embodiments, the switch 316 may be toggled at a constant rate (e.g., every 10 ms, 100 ms, 500 ms, etc. based on control signals 317) so as to sample signals of different types (i.e., RHCP or LHCP) output from the RF coupler 314 over a defined time period. Put another way, both types of circularly polarized signals may be received by "time-multiplexing" with the switch 316, receiving for example RHCP signals half of the time on a regular interval (e.g., every other 10 ms) and LHCP signals half of the time on a regular interval (e.g., every other 10 ms) as the switch repeatedly toggles between the two positions at the constant rate. In some cases, the switch may be toggled at a non-constant rate so as to sample some signals, e.g., RHCP signals, more often. An illustrative graph 330 shows that some time periods are occupied by RHCP signals and other time periods are occupied by LHCP signals in, e.g., a 1:1 ratio during transmission over a signal path 318.

The antenna subsystem 310 may be configured for signal communication with the baseband subsystem 320 and/or its components via the signal path 318. In some embodiments, the signal path 318 may be a shielded analog signal path, e.g., a coaxial cable, a signal trace in proximity to guard traces, a shunt trace.

The switching performed by the switch 316 may advantageously reduce the complexity of the architecture as shown in FIG. 3, including the signal path 318 connecting the antenna subsystem 310 and the baseband subsystem 320. More specifically, only a single signal path may be needed by using a switch, as opposed to multiple signal paths for respective signals (e.g., RHCP and LHCP). Note that in certain embodiments, other signal paths and/or buses may be present for delivering received signals or data for purposes other than positioning.

In one implementation, the switch 316 may be configured to selectively pass signals of a certain type (e.g., RHCP signals) while rejecting other signals until indicated otherwise (e.g., toggled by a control signal) by the antenna subsystem 310 or the baseband subsystem 320. For example, the baseband subsystem 320 may desire to receive RHCP signals (or RHCP-dominated signals) only and toggle the switch 316 to only receive RHCP signals while rejecting LHCP signals.

In another implementation, activity of the antennas may be adjusted in UEs using dedicated RHCP and LHCP antennas. For example, one of the antennas 312 may remain active in order to detect and receive RHCP signals only, and the other antenna is deactivated to disregard any LHCP signals. In configurations with more than two antennas, redundant antennas may be similarly deactivated.

While the antenna subsystem 310 is comprised primarily of hardware and circuitry configured to receive and generate signals of different polarization states, the baseband subsystem 320 is comprised primarily of hardware and circuitry configured to process signals obtained from the antenna subsystem. In some embodiments, the baseband subsystem 320 may include one or more receivers, such as RF receiver modules 322-1, 322-2 (collectively referred to as receivers 322). Although FIG. 3 illustrates two receivers 322-1 and 322-2, it is appreciated that in some embodiments, a baseband subsystem 320 may include and operate a single receiver (e.g., 322-1); and in some embodiments, a two-receiver subsystem as shown in FIG. 3 may have one receiver idle depending on the state of the switch 316 and/or switch 324 (based, e.g., on control signals 317 and/or 325). In some embodiments, the baseband subsystem 320 may include at least one processor and/or logic circuitry. The receivers 322 may demodulate received RHCP signals so as to obtain data contained in the positioning signals (e.g., positioning and timing information as alluded to above). In certain embodiments, signals of a given polarization state may be processed (e.g., demodulated) by a corresponding receiver. For instance, RHCP signals may be processed by receiver 322-1, and LHCP signals may be processed by receiver 322-2. In addition, each receiver 322 may measure a signal strength of the received signal. The strength of these signals may be measured and represented by their carrier-to-noise-density ratio $C/N_0$, which is the ratio of carrier power C to noise power density $N_0$. These signal strengths may be generated as data or data structures (e.g., tables or reports containing $C/N_0$ values for RHCP and LHCP signals over defined sampling time periods) and accessed by other components of the UE (e.g., processor, memory) for evaluation or storage. As part of the evaluation, various statistical parameters may be obtained from the $C/N_0$ values, e.g., mean (over a given set of values), average (over the running total), median, minimum, maximum, and/or standard deviation.

The baseb and subsystem 320 may further include a switch 324. Similar to the switch 316 in the antenna subsystem 310, the switch 324 in the baseband subsystem 320 may toggle at a constant rate. The switch 324 may be toggled based on control signals 325 generated at the baseband subsystem 320. Both switches 316 and 324 may toggle synchronously at the same rate so as to allow proper routing of the received RHCP or LHCP signals to the respective receivers 322-1 and 322-2.

In some embodiments, switches 316 and 324 may be set to receive LHCP outputs to obtain sample measurements based on certain triggering conditions, and then brought back to RHCP for the final position solution. In these embodiments, the switch is normally set to receive RHCP signals, and receiving LHCP signals may not be desired for long periods of time. However, in some implementations, the switch may be triggered to be set to receive LHCP signals periodically (every 10 seconds, 15 seconds, 60 seconds, etc.) for a portion of that period (for 3 seconds, 5 seconds, 15 seconds, etc.). In some implementations, the switch may be triggered to be set to receive LHCP signals based on data within the receivers 322. For example, one or more of the receivers 322 may detect $C/N_0$ variations or measurement residual values from the estimated position from prior measurements, leading to a suspicion or indication of multipath on at least one SV. As another example, the receivers 322 may also have suspicion or indication of a multipath-rich environment (e.g., an urban canyon or indoors) based on, e.g., prior measurements, "crowd-sourced" data stored and accessible by the UE (as will be discussed in greater detail below), or positioning based on other communication protocols (e.g., WLAN or cellular) that may indicate that a UE is in a certain known area. Under such conditions, the receivers 322 may switch momentarily to LHCP, obtain a measurement, then switch back to RHCP, obtain another measurement, and from the difference in RHCP and LHCP measurements, determine which SV(s) have a likelihood of being corrupted by multipath, and de-weight them in the final position solution. Specific examples of comparison of RHCP and LHCP signal components to determine multipath will be described further with respect to FIG. 13.

It is useful for a UE to have the capability to obtain and identify circularly polarized signals via linear antennas as shown in FIG. 3. Specifically, by employing linear antennas and a baseband subsystem that can obtain circularly polarized RHCP or LHCP signals, circular polarization characteristics of a positioning signal may be measured without use of dedicated circularly polarized antennas, and thereby allow determination or estimation of multipath or probability of multipath on the signal using existing antennas (e.g., PIFA) on the UE. Specifically, RHCP and LHCP signal strengths may be compared to each other to deduce the presence of multipath or the likelihood of multipath. Although not entirely determinative of signaling quality, such multipath determination can provide another dimension to existing positioning techniques to optimize the positioning of a device.

Further, this type of approach may be used to characterize or classify the type of environment the UE is in (open field, urban canyon, suburban, etc.), and use the type of environment to tune or adjust the behavior of the device, e.g., adjust sensitivity threshold for signal reception or energy detection, adjust the frequency band and/or reallocate resources for antenna usage (e.g., seek Wi-Fi signals instead), adjust "backoff" periods for detecting positioning signals, or reduce processing or battery usage. This can be especially helpful if it has been determined that the UE is in an "urban canyon" environment with a high likelihood of multipath caused by numerous buildings or structures.

Such multipath information and type of environment inferred from comparing RHCP and LHCP signal strengths can also drive various operational decisions. The information based on multipath determination can be used to, e.g., weight, de-weight, or reject one or more SVs and/or their signals to yield a position result that is more reliable than traditional positioning. Such improved positioning may be useful in situations where WLAN or cellular communication is unavailable to assist the UE with positioning.

Moreover, in certain embodiments, multipath information obtained in the manner described herein may be helpful for identifying UE locations and environments where there is no prior tracking history. That is, characterization of an environment that the UE has previously measured its location in may be used to supplement or obviate usage of at least some positioning techniques. For example, if it is known (from prior measurement or prior "crowdsourced" data stored on or accessible via the UE) that a particular intersection in a city tends to yield a specific polarization profile or behavior (e.g., measurements RHCP and LHCP signal components resulting from multipath caused by surrounding buildings), the UE may, for instance, match the polarization profile to known locations and other environmental contexts (e.g., buildings, tunnels, natural or geographic features), and thereby estimate its position without necessarily relying on trilateration, signal strength measurement, etc. Moreover, in some implementations, machine learning techniques (using, e.g., neural networks) may also be used with the prior crowdsourced data to train the UE or portions of the positioning system (e.g., the location server 160) to yield more accurate or granular relationships between polarization profiles, multipath determination, and classifications of the environmental context. In some implementations, a learning model may be continually trained (using at least, e.g., forward propagation and backpropagation) utilizing any suitable supervised, unsupervised, semi-supervised, and/or reinforced learning algorithms in conjunction with the prior data. Polarization profiles correlating signal strengths, multipath determination, and environment types are further discussed below with respect to FIG. 13.

Hence, the configuration of FIG. 3 is capable of using linear antennas 312 to obtain signals having specific circular polarizations, i.e., RHCP and LHCP. A comparison of the strengths of the RHCP and LHCP components of the received signal may be used to make a determination of the multipath environment, or the probability of multipath, experienced by the positioning signal from a specific SV (i.e., on a per-SV basis).

Figure 4:
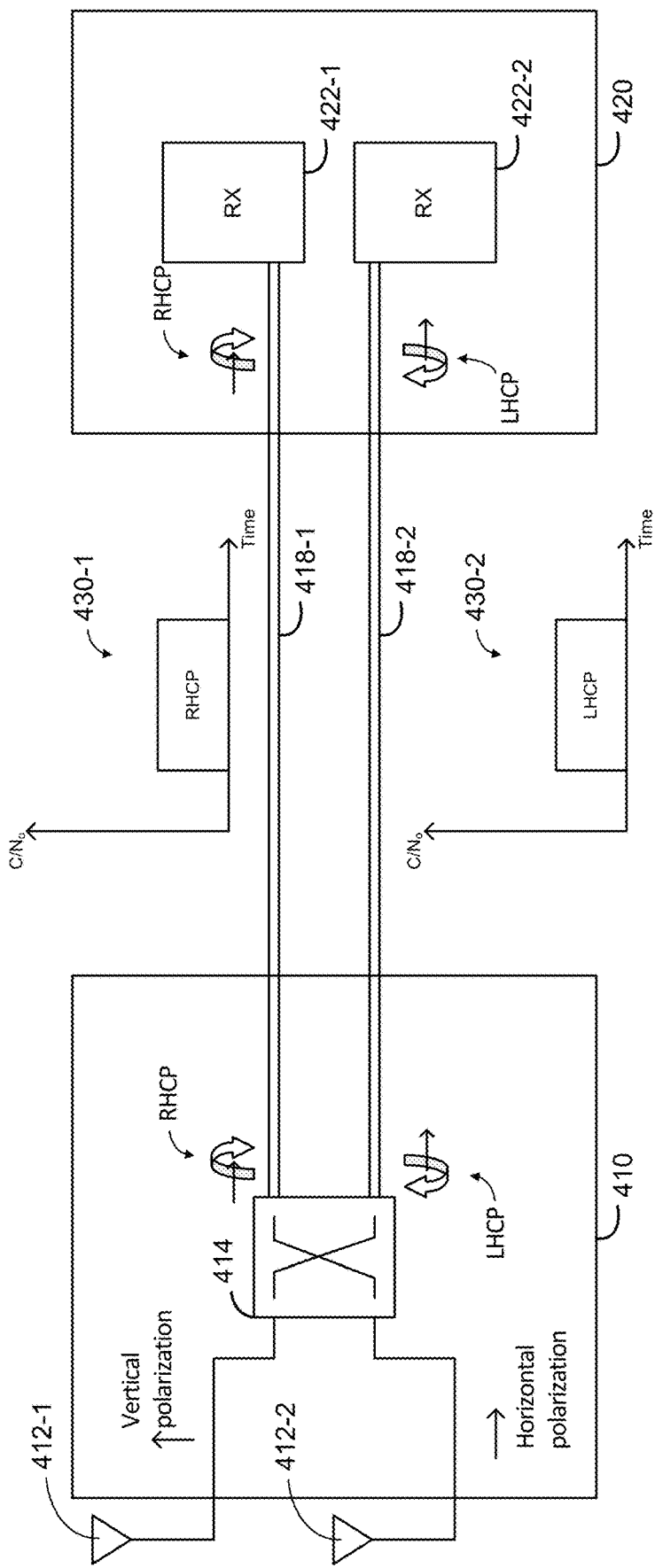
FIG. 4 illustrates a block diagram of a configuration of an antenna subsystem and a baseband subsystem of a wireless device, using two signal paths configured to transmit circularly polarized signals from the antenna subsystem to the baseband subsystem, according to one embodiment.

FIG. 4 illustrates a block diagram of a configuration of an antenna subsystem 410 and a baseband subsystem 420 of a wireless device (e.g., a UE 105), according to another embodiment. The antenna subsystem 410 may include a plurality of receiving antennas, such as two antennas 412-1 and 412-2 (collectively referred to as antennas 412). In some embodiments, each of the antennas 412-1 and 412-2 may be configured to detect linearly polarized signals or signal components. In certain embodiments, each of the antennas 412-1 and 412-2 may be a planar inverted-F antenna (PIFA) type antenna. Antennas 412 may be examples of the antennas 312 discussed with respect to FIG. 3.

The antenna subsystem 410 may include an RF coupler 414 that is configured to receive and combine inputs from the two antennas 412 into an output signal having a different polarization type. In some embodiments, antennas 412 may include dedicated RHCP and LHCP antennas. In these embodiments, RF coupler 414 may not be necessary. In some embodiments, the RF coupler 414 may be a 90-degree hybrid coupler, configured to receive two input signals (e.g., vertically polarized and horizontally polarized) and output combined phase-shifted signals, e.g., RHCP and LHCP signals. For example, linearly polarized components obtained via the antennas 412 may be combined into circularly polarized signals, e.g., RHCP or LHCP signals.

The antenna subsystem 410 may be configured for signal communication with the baseband subsystem 420 and/or its components via two (or more) signal paths 418-1 and 418-2 (collectively referred to as signal paths 418). In some embodiments, signal paths 418 may be shielded analog signal paths, e.g., coaxial cables, signal traces in proximity to guard traces, shunt traces. One type of output from the RF coupler 414, e.g., RHCP signals, may be transmitted directly to a receiver module 422-1 of the baseband subsystem 420 via the signal path 418-1. Another type of output from the RF coupler 414, e.g., LHCP signals, may be transmitted directly to a receiver module 422-2 of the baseband subsystem 420 via the signal path 418-2. Receiver modules 422-1 and 422-2 (collectively referred to as 422) may be examples of receivers 322-1 and 322-2 of FIG. 3. Similar to embodiments described with respect to FIG. 3, in certain embodiments, the baseband subsystem 420 may include and operate a single receiver (e.g., 422-1), with RHCP signals and LHCP signals time-multiplexed over one signal path.

The configuration of FIG. 4 differs from that of FIG. 3, as it includes multiple signal paths but does not include switches such as switches 316 and 324. No on-demand real-time switching is required since the RHCP and LHCP signals are available to the baseband circuitry simultaneously. Advantageously, the receivers 422 may each receive an increased amount of data as compared to the receivers 322-1 and 322-2 of FIG. 3 because the toggling of switches 316 and 324 causes the receivers 322 to sample less than the full amount of each type of signal over a given period of time in a "time-multiplexed" fashion, and the receivers 422 receive all of the output signals. Illustrative graphs 430-1 and 430-2 show that the entire transmission period for the signal path 418-1 is occupied by RHCP signals and the entire transmission period for the signal path 418-2 is occupied by LHCP signals.

However, the UE may be space-constrained depending on its form factor, chassis type, or device capabilities requiring additional or larger components. For instance, UEs dedicated to positioning (e.g., GPS equipment) may benefit from dedicated signal paths 418, while small form factor consumer devices such as smartphones may not. Moreover, it is still possible that the baseband subsystem 420 may choose to process only RHCP or LHCP signals at any given time based on limited or re-routed processing resources. Thus, utilizing multiple signal paths 418 over a switch (e.g., 316) may be desirable depending on the implementation.

Figure 5:
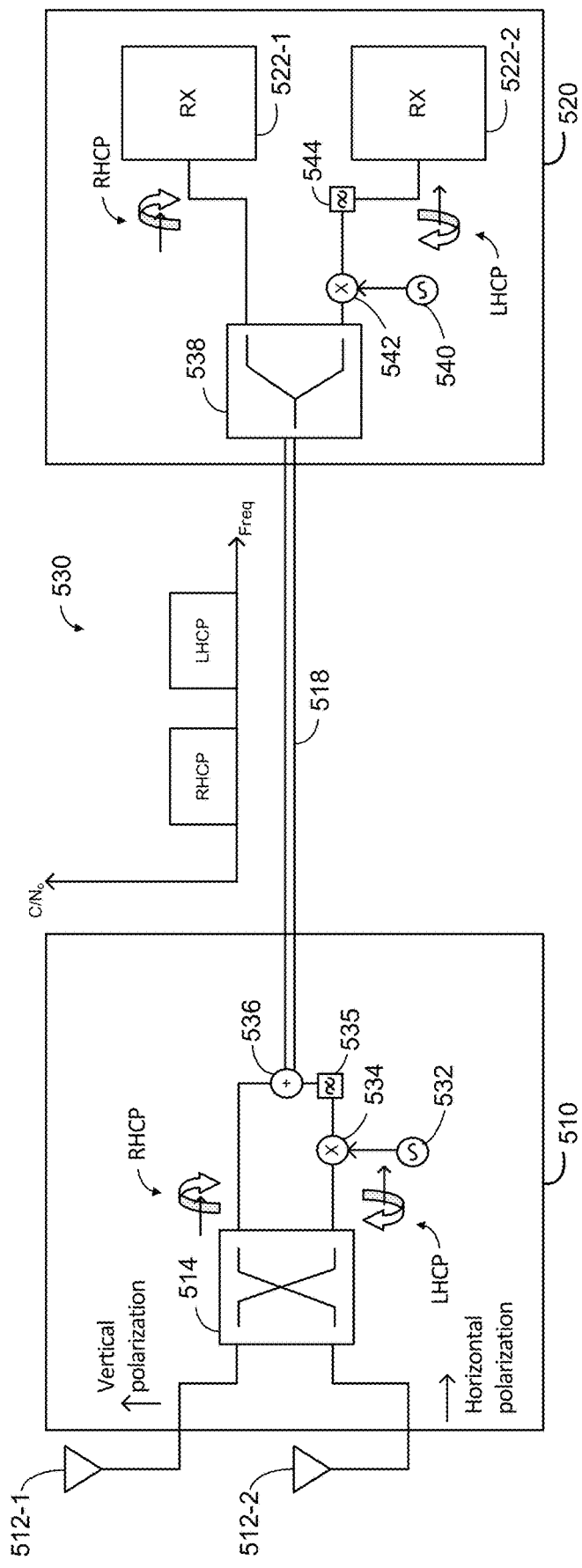
FIG. 5 illustrates a block diagram of a configuration of an antenna subsystem and a baseband subsystem of a wireless device, using a single signal path to transmit frequency-multiplexed, circularly polarized signals from the antenna subsystem to the baseband subsystem, according to one embodiment.

FIG. 5 is a block diagram of a configuration of an antenna subsystem 510 and a baseband subsystem 520 of a wireless device (e.g., a UE 105), according to another embodiment. The antenna subsystem 510 may include a plurality of receiving antennas, such as two antennas 512-1 and 512-2 (collectively referred to as antennas 512). In some embodiments, each of the antennas 512-1 and 512-2 may be configured to receive linearly polarized signals or signal components. In certain embodiments, each of the antennas 512-1 and 512-2 may be a planar inverted-F antenna (PIFA) type antenna. Antennas 512 may be examples of the antennas 312 discussed with respect to FIG. 3.

The antenna subsystem 510 may include an RF coupler 514 that is configured to receive and combine inputs from the two antennas 512 into an output signal having a different polarization type. In some embodiments, the RF coupler 514 may be a 90-degree hybrid coupler, configured to receive two input signals (e.g., vertically polarized and horizontally polarized) and output combined phase-shifted signals, e.g., RHCP and LHCP signals. For example, linearly polarized components obtained via the antennas 512 may be combined into circularly polarized signals, e.g., RHCP or LHCP signals.

In some embodiments, the antenna subsystem 510 may include an oscillator circuit 532, a multiplier circuit 534, a filter circuit 535, and an adder circuit 536. The oscillator 532 may be configured to produce an alternating waveform (e.g., a sin wave) of a prescribed frequency. The multiplier 534 may be configured to shift the frequency of one of the outputs of the RF coupler 514, e.g., the LHCP signals, away from the baseband by applying the waveform generated by the oscillator 532 to the output of the RF coupler. The filter 535 may be configured to filter the frequency portion of interest, and in some embodiments may include, e.g., a bandpass filter. The adder 536 may be configured to combine the signal waveforms of one output (e.g., RHCP signals) with the signal waveforms of another output (e.g., LHCP signals) modulated to a different frequency domain by the multiplier 534 to produce a frequency-multiplexed signal. In some embodiments, a frequency shifter component (not shown) may include at least the oscillator, the multiplier, and/or the filter.

The antenna subsystem 510 may be configured for signal communication with the baseband subsystem 520 and/or its components via the signal path 518. In some embodiments, the signal path 518 may be a shielded analog signal path, e.g., a coaxial cable, a signal trace in proximity to guard traces, a shunt trace. A single signal path (e.g., 518) may carry the frequency-multiplexed signal from the adder 536 to the baseband subsystem 520.

The baseband subsystem 520 may include a diplexer 538, configured to split the frequency-multiplexed signal received over the signal path 518. Each split signal may experience some insertion loss. The baseband subsystem 520 may further include one or more receivers, such as RF receiver modules 522-1, 522-2 (collectively referred to as receivers 522). Receiver modules 522-1 and 522-2 may be examples of receivers 322-1 and 322-2 of FIG. 3. More specifically, receiver module 522-1 may be configured to receive and demodulate baseband RHCP signals. Receiver module 522-2 may be configured to receive and demodulate baseband LHCP signals. Hence, receiver module 522-1 does not require any shifting to demodulate RHCP signals in the received frequency-multiplexed signal since RHCP signals have not been shifted, and receiver module 522-2 requires downshifting of the LHCP signals.

To that end, the baseband subsystem 520 may include an oscillator circuit 540, a multiplier circuit 542, and a filter circuit 544. The oscillator 540 may be configured to produce an alternating waveform (e.g., a sin wave) of a prescribed frequency similar to that of the frequency of the waveform generated by oscillator 532. The multiplier 542 may apply the waveform to the received signal to downshift the frequency of the LHCP signals in the frequency-multiplexed signal back to the original frequency range. The filter 544 may be configured to filter the frequency portion of interest, and in some embodiments may include, e.g., a low pass filter.

Similar to the time-multiplexing embodiment of FIG. 3, the configuration of FIG. 5 does not require multiple signal paths. An illustrative graph 530 shows that at least one frequency range is occupied by RHCP signals and at least another frequency range is occupied by LHCP signals, both of which may be sampled at the antenna subsystem 510 and transmitted over the single signal path 518 during the entire transmission period. The reconstruction of circularly polarized signals according to the FIG. 5 embodiment requires multiple transformations via the RF coupler 514, oscillator 532, diplexer 538, and oscillator 540, among other components, which may result in loss of signal power while adding costs (e.g., battery power, component costs) to operate. However, this configuration may result in fewer wiring and less electromagnetic interference.

Figure 6:
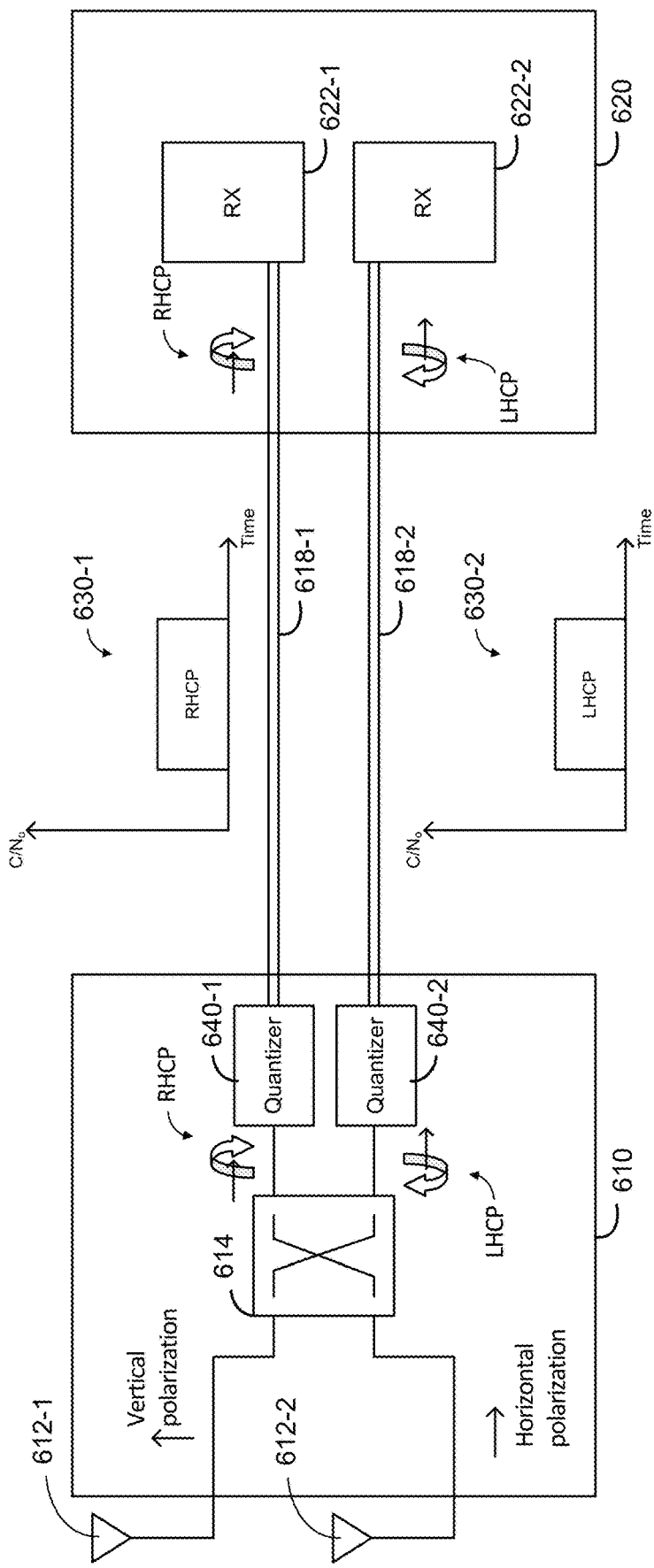
FIG. 6 illustrates a block diagram of a configuration of an antenna subsystem and a baseband subsystem of a wireless device, using two signal paths to transmit digitized, circularly polarized signals from the antenna subsystem to the baseband subsystem, according to one embodiment.

FIG. 6 is a block diagram of a configuration of an antenna subsystem 610 and a baseband subsystem 620 of a wireless device (e.g., a UE 105), according to another embodiment. The antenna subsystem 610 may include a plurality of receiving antennas, such as two antennas 612-1 and 612-2 (collectively referred to as antennas 612). In some embodiments, each of the antennas 612-1 and 612-2 may be configured to detect linearly polarized signals or signal components. In certain embodiments, each of the antennas 612-1 and 612-2 may be a planar inverted-F antenna (PIFA) type antenna. Antennas 612 may be examples of the antennas 312 discussed with respect to FIG. 3.

The antenna subsystem 610 may include an RF coupler 614 that is configured to receive and combine inputs from the two antennas 612 into an output signal having a different polarization type. In some embodiments, the RF coupler 614 may be a 90-degree hybrid coupler, configured to receive two input signals (e.g., vertically polarized and horizontally polarized) and output combined phase-shifted signals, e.g., RHCP and LHCP signals. For example, linearly polarized components obtained via the antennas 612 may be combined into circularly polarized signals, e.g., RHCP or LHCP signals.

The antenna subsystem 610 may include a corresponding quantizer 640-1 or 640-2 (collectively referred to as quantizers 640) for each output of the RF coupler 614. In some embodiments, each quantizer 640 may be an analog-to-digital converters (ADC), configured to convert analog signals into digital signals. For example, RHCP signals may be input to the ADC 640-1, and LHCP signals may be input to the ADC 640-2, resulting in digital signals (i.e., bits) as outputs.

The antenna subsystem 610 may be configured for digital data communication with the baseband subsystem 620 and/or its components via two (or more) data buses 618-1 and 618-2 (collectively referred to as buses 618). In some embodiments, buses 618 may include any type of communication cables, lines, wires, links, pins, used with any known architecture (Serial ATA (SATA), Peripheral Component Interconnect (PCI), etc.). The buses 618 may also include a coaxial cable such as the signal path 318 used with the FIG. 3 embodiment.

The output from the ADC 640-1 may be transmitted directly to a receiver module 622-1 of the baseband subsystem 620 via the data bus 618-1. The output from the ADC 640-2 may be transmitted directly to a receiver module 622-2 of the baseband subsystem 620 via the data bus 618-2. Receiver modules 622-1 and 622-2 (collectively referred to as 622) may be configured to receive digitized data and perform similar functions as those of receivers 322-1 and 322-2 of FIG. 3 (including, e.g., determining C/No values). Receivers 622 may also determine and quantize signal strength levels based on the received digital data from the antenna subsystem 610. For example, signal strengths may be assigned one of, e.g., 256 discrete levels represented by 8 bits. This range of values may allow efficient statistical binning (e.g., in a histogram) and derivation of other statistical parameters as noted elsewhere herein.

Using multiple data buses may allow increased throughput of data transferred between the antenna subsystem 610 and the baseband subsystem 620, as compared to using signal paths. Illustrative graphs 630-1 and 630-2 show that the entire transmission period for the data bus 618-1 is occupied by RHCP signals and the entire transmission period for the data bus 618-2 is occupied by LHCP signals. In positioning-intensive applications of the UE (e.g., navigation, travel, gaming, UE as a dedicated GPS system), inclusion of additional components in the UE such as quantizers (e.g., 640) and data buses (e.g., 618) may advantageously speed up location determination.

Figure 7:
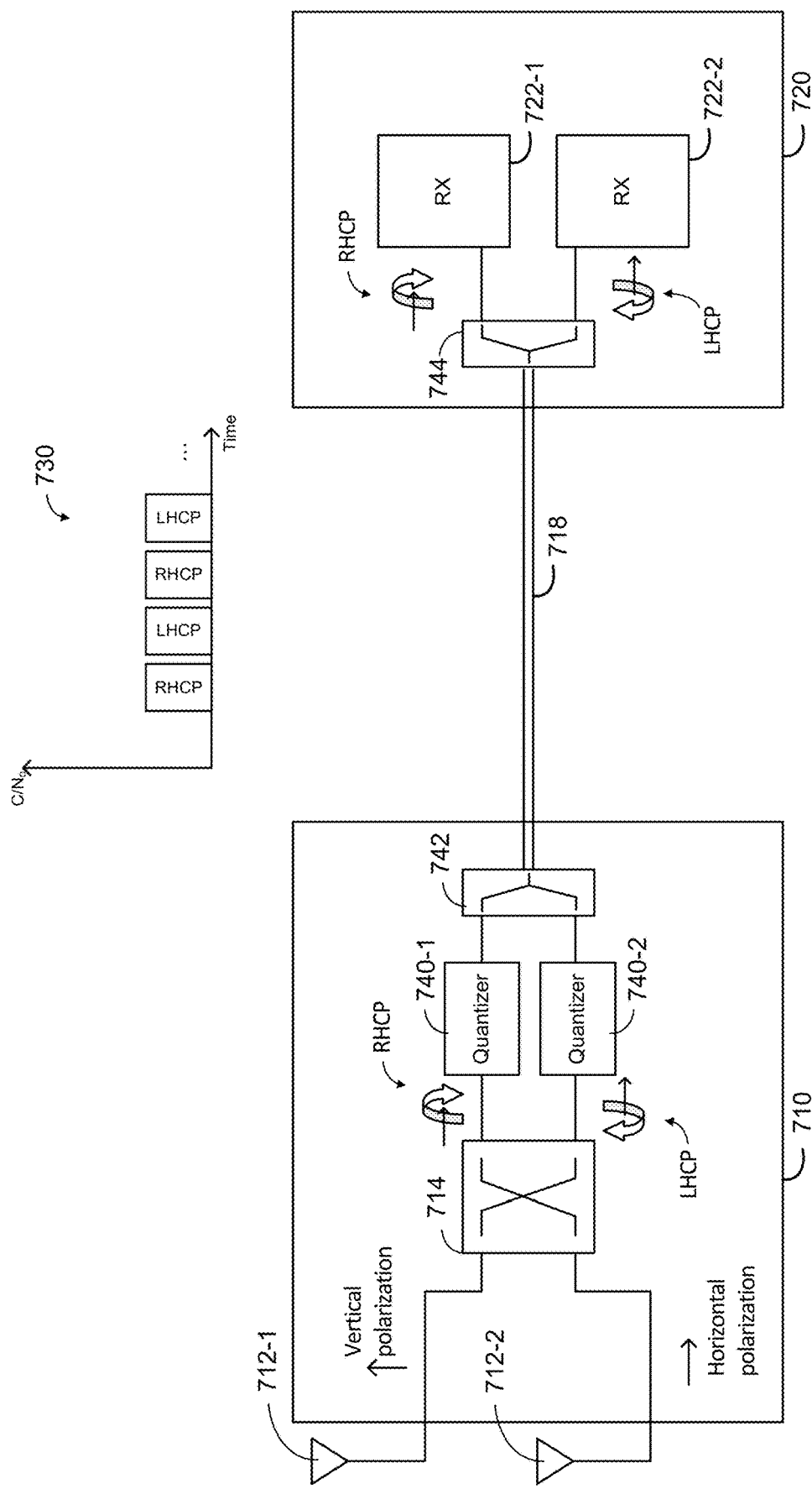
FIG. 7 illustrates a block diagram of a configuration of an antenna subsystem and a baseband subsystem of a wireless device, using one signal path to transmit digitized, circularly polarized signals from the antenna subsystem to the baseband subsystem, according to one embodiment.

FIG. 7 is a block diagram of a configuration of an antenna subsystem 710 and a baseband subsystem 720 of a wireless device (e.g., a UE 105), according to another embodiment. The antenna subsystem 710 may include a plurality of receiving antennas, such as two antennas 712-1 and 712-2 (collectively referred to as antennas 712). In some embodiments, each of the antennas 712-1 and 712-2 may be configured to detect linearly polarized signals or signal components. In certain embodiments, each of the antennas 712-1 and 712-2 may be a planar inverted-F antenna (PIFA) type antenna. Antennas 712 may be examples of the antennas 312 discussed with respect to FIG. 3.

The antenna subsystem 710 may include an RF coupler 714 that is configured to receive and combine inputs from the two antennas 712 into an output signal having a different polarization type. In some embodiments, the RF coupler 714 may be a 90-degree hybrid coupler, configured to receive two input signals (e.g., vertically polarized and horizontally polarized) and output combined phase-shifted signals, e.g., RHCP and LHCP signals. For example, linearly polarized components obtained via the antennas 712 may be combined into circularly polarized signals, e.g., RHCP or LHCP signals.

The antenna subsystem 710 may include a corresponding quantizer 740-1 or 740-2 (collectively referred to as quantizers 740) for each output of the RF coupler 714. In some embodiments, each quantizer 740 may be an analog-to-digital converters (ADC), configured to convert analog signals into digital signals. For example, RHCP signals may be input to the ADC 740-1, and LHCP signals may be input to the ADC 740-2, resulting in digital signals (i.e., bits) as outputs. Quantizers 740 may be examples of the quantizers discussed with respect to FIG. 6.

The antenna subsystem 710 may also include a digital combiner 742, configured to combine multiple digital signals into one signal. Once quantized into digital form, the RHCP and LHCP signals can be combined in a myriad of ways and transmitted over a path 718 from the antenna subsystem 710 to the baseband subsystem 720. Here, a combiner 742 generally represents such an operation. For example, if the path 718 is a data line or bus having sufficiently high data rate, the combiner 742 can simply be implemented as a multiplexer that multiplexes the digitized RHCP and LHCP signals into one digital stream, which can be transmitted over the path 718. Path 718 may be an example of the data bus 618 of FIG. 6.

In some embodiments, the digital combiner 742 may include or be coupled to a switch (not shown) such that the signals from the quantizers 740 are time-multiplexed. The switch may be toggled at a constant rate, and may be an example of the switch 316 discussed with respect to FIG. 3. An illustrative graph 730 shows that some time periods are occupied by converted RHCP signals and other time periods are occupied by converted LHCP signals in, e.g., a 1:1 ratio during transmission over the path 718.

The baseband subsystem 720 may include a digital splitter 744, which reverses the combination performed by the digital combiner 742. In some embodiments, the digital splitter 744 may include another switch (not shown), which may be toggled synchronously at the same rate as the switch associated with the digital combiner 742 so as to allow proper routing of the converted RHCP and LHCP signals to respective receivers 722-1 and 722-2 (collectively referred to as receivers 722). The receivers 722 may be configured to receive digitized data and perform similar functions as those of receivers 322-1 and 322-2 of FIG. 3 (including, e.g., determining $C/N_0$ values). Receivers 722 may also determine and quantize signal strength levels based on the received digital data from the antenna subsystem 710. Although additional components such as the digital combiner 742 and digital splitter 744 may cause signal power loss, this configuration may result in fewer wiring and less electromagnetic interference, which may be advantageous for certain smaller form factor UEs.

Figure 8:
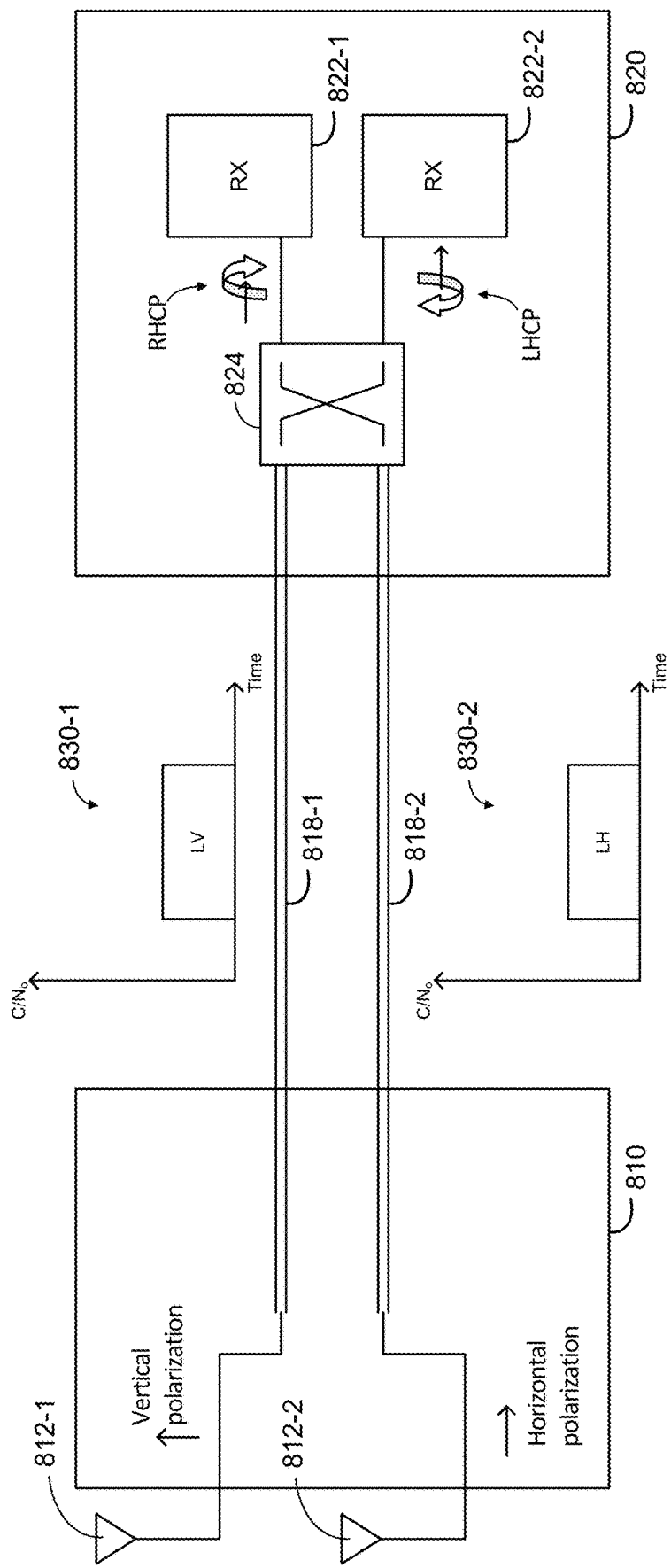
FIG. 8 illustrates a block diagram of a configuration of an antenna subsystem and a baseband subsystem of a wireless device, using two signal paths configured to transmit linearly polarized signals from the antenna subsystem to the baseband subsystem, according to one embodiment.

FIG. 8 is a block diagram of a configuration of an antenna subsystem 810 and a baseband subsystem 820 of a wireless device (e.g., a UE 108), according to another embodiment. The antenna subsystem 810 may include a plurality of receiving antennas, such as two antennas 812-1 and 812-2 (collectively referred to as antennas 812). In some embodiments, each of the antennas 812-1 and 812-2 may be configured to detect linearly polarized signals or signal components. In certain embodiments, each of the antennas 812-1 and 812-2 may be a planar inverted-F antenna (PIFA)

type antenna. Antennas 812 may be examples of the antennas 312 discussed with respect to FIG. 3.

The antenna subsystem 810 may be configured for signal communication with the baseband subsystem 820 and/or its components via two (or more) signal paths 818-1 and 818-2 (collectively referred to as signal paths 818). In some embodiments, signal paths 818 may be shielded analog signal paths, e.g., coaxial cables, signal traces in proximity to guard traces, shunt traces.

The baseband subsystem 820 may include an RF coupler 824 that is configured to receive and combine inputs from the two antennas 812 into an output signal having a different polarization type. In some embodiments, the RF coupler 824 may be a 90-degree hybrid coupler, configured to receive two input signals (e.g., linearly vertically polarized (LV) and linearly horizontally polarized (LH)) and output combined phase-shifted signals, e.g., RHCP and LHCP signals. For example, linearly polarized components obtained via the antennas 812 may be combined into circularly polarized signals, e.g., RHCP or LHCP signals.

Resulting RHCP signals output from the RF coupler 824 may be received and processed by a corresponding receiver module 822-1, and LHCP output signals from the RF coupler 824 may be received and processed by a corresponding receiver module 822-2. To this end, signals received at antenna 812-1 may be directly transmitted to the coupler 824 via the signal path 818-1, and signals received at antenna 812-2 may be directly transmitted to the coupler 824 via the signal path 818-2. Receiver modules 822-1 and 822-2 (collectively referred to as receivers 822) may be examples of receivers 322-1 and 322-2 of FIG. 3.

In contrast to the embodiment shown in FIG. 4, the signals are combined at the baseband subsystem 820 rather than at the antenna subsystem 810 in the embodiment of FIG. 8. Similar advantages and tradeoffs exist in the FIG. 8 embodiment; i.e., each type of signal is received at the corresponding receiver for the entire duration of transmission over the corresponding one of multiple signal paths. Wireless devices or systems utilizing more robust baseband subsystems (e.g., those capable of receiving and transmitting, selectively or otherwise, various types of wireless signals, including WLAN, cellular, GNSS positioning, Bluetooth, etc.) may include an RF coupler (e.g., 824) for use with such purposes or related considerations. Linearly polarized signals may be received by the baseband subsystem 820 and/or routed elsewhere (e.g., cellular components) instead of being preemptively combined at the antenna subsystem. Illustrative graphs 830-1 and 830-2 show that the entire transmission period for the signal path 818-1 is occupied by linearly vertical signals and the entire transmission period for the signal path 818-2 is occupied by linearly horizontal signals.

Figure 9:
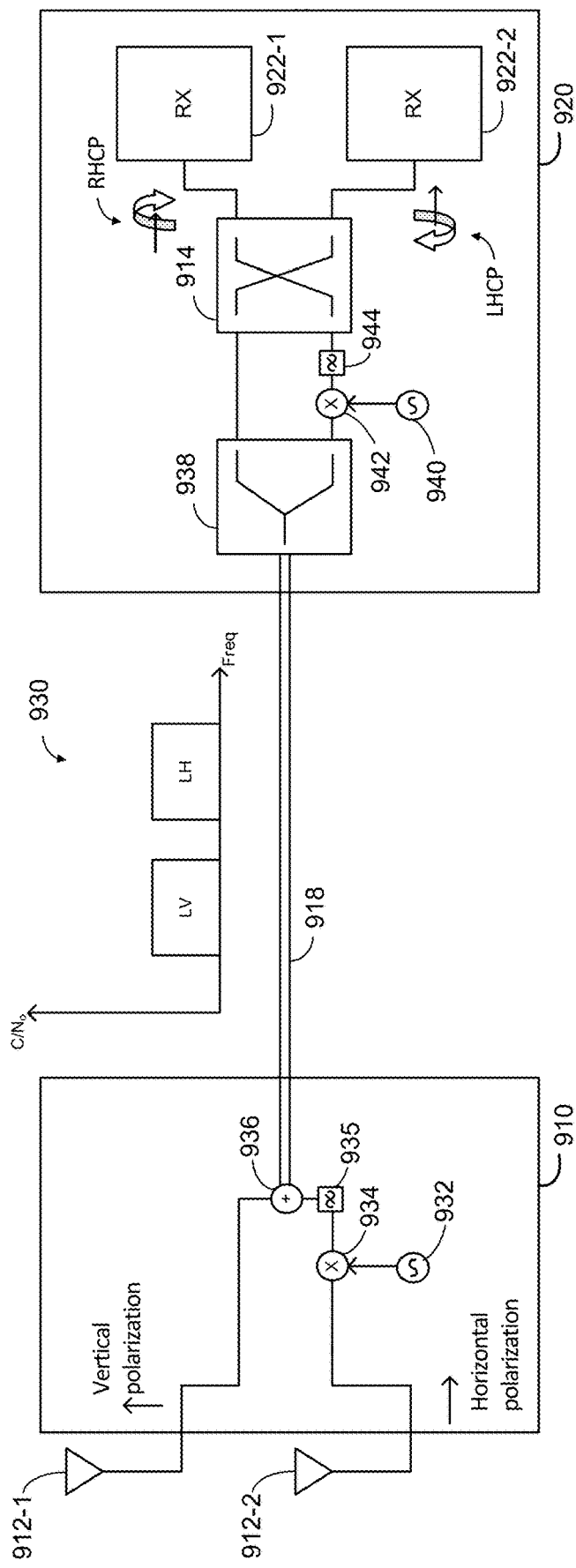
FIG. 9 illustrates a block diagram of a configuration of an antenna subsystem and a baseband subsystem of a wireless device, using a single signal path to transmit frequency-multiplexed, linearly polarized signals from the antenna subsystem to the baseband subsystem, according to one embodiment.

FIG. 9 is a block diagram of a configuration of an antenna subsystem 910 and a baseband subsystem 920 of a wireless device (e.g., a UE 105), according to another embodiment. The antenna subsystem 910 may include a plurality of receiving antennas, such as two antennas 912-1 and 912-2 (collectively referred to as antennas 912). In some embodiments, each of the antennas 912-1 and 912-2 may be configured to receive linearly polarized signals or signal components. In certain embodiments, each of the antennas 912-1 and 912-2 may be a planar inverted-F antenna (PIFA) type antenna. Antennas 912 may be examples of the antennas 312 discussed with respect to FIG. 3.

In some embodiments, the antenna subsystem 910 may include an oscillator circuit 932, a multiplier circuit 934, a filter circuit 935, and an adder circuit 936, which may be examples of the oscillator circuit 532, multiplier circuit 534, filter circuit 535, and adder circuit 536 as described with respect to FIG. 5. Here, the multiplier 934 may be configured to shift the frequency of one of the received linearly polarized signals, e.g., the horizontally polarized signals as shown in FIG. 9, away from the baseband by applying the waveform generated by the oscillator 932. It will be appreciated that in other embodiments, the vertically polarized signals may be shifted instead. The adder 936 may be configured to combine the signal waveforms of one output (e.g., vertically polarized signals) with the signal waveforms of another output (e.g., horizontally polarized signals) modulated to a different frequency domain by the multiplier 934 to produce a frequency-multiplexed signal. In some embodiments, a frequency shifter component (not shown) may include at least the oscillator, the multiplier, and/or the filter.

The antenna subsystem 910 may be configured for signal communication with the baseband subsystem 920 and/or its components via the signal path 918. The signal path 918 may be an example of the signal path 518 of FIG. 5. A single signal path (e.g., 918) may carry the frequency-multiplexed signal from the adder 936 to the baseband subsystem 920.

The baseband subsystem 920 may include a diplexer 938, configured to split the frequency-multiplexed signal received over the signal path 918. The diplexer 938 may be an example of the diplexer 538 of FIG. 5. The baseband subsystem 920 may further include an oscillator circuit 940, a multiplier circuit 942, and a filter circuit 944, which may be examples of the oscillator circuit 540, multiplier circuit 542, and filter circuit 544 of FIG. 5. The multiplier 942 may apply frequency shifting of the received signal to downshift the frequency of the horizontally polarized signals in the frequency-multiplexed signal back to the original frequency range.

The baseband subsystem 920 may further include an RF coupler 914 that is configured to receive and combine inputs from the splitter 938 into output signals having different circularly polarized types. In some embodiments, the RF coupler 914 may be a 90-degree hybrid coupler, configured to receive two input signals (e.g., vertically polarized and horizontally polarized) and output combined phase-shifted signals, e.g., RHCP and LHCP signals. For example, linearly polarized components obtained via the antennas 912, shifted at the antenna subsystem 910, and recovered at the baseband subsystem 920 may be combined into circularly polarized signals, e.g., RHCP or LHCP signals. RHCP and LHCP signals may be received at one or more receivers, such as RF receiver modules 922-1, 922-2. Receiver modules 922-1 and 922-2 may be examples of receivers 522-1 and 522-2 of FIG. 5.

In this manner, linearly polarized signals may be frequency-multiplexed and received over a single signal path, similar to FIG. 5. An illustrative graph 930 shows that at least one frequency range is occupied by linearly vertical (LV) signals and at least another frequency range is occupied by LH (linearly horizontal) signals.

Figure 10:
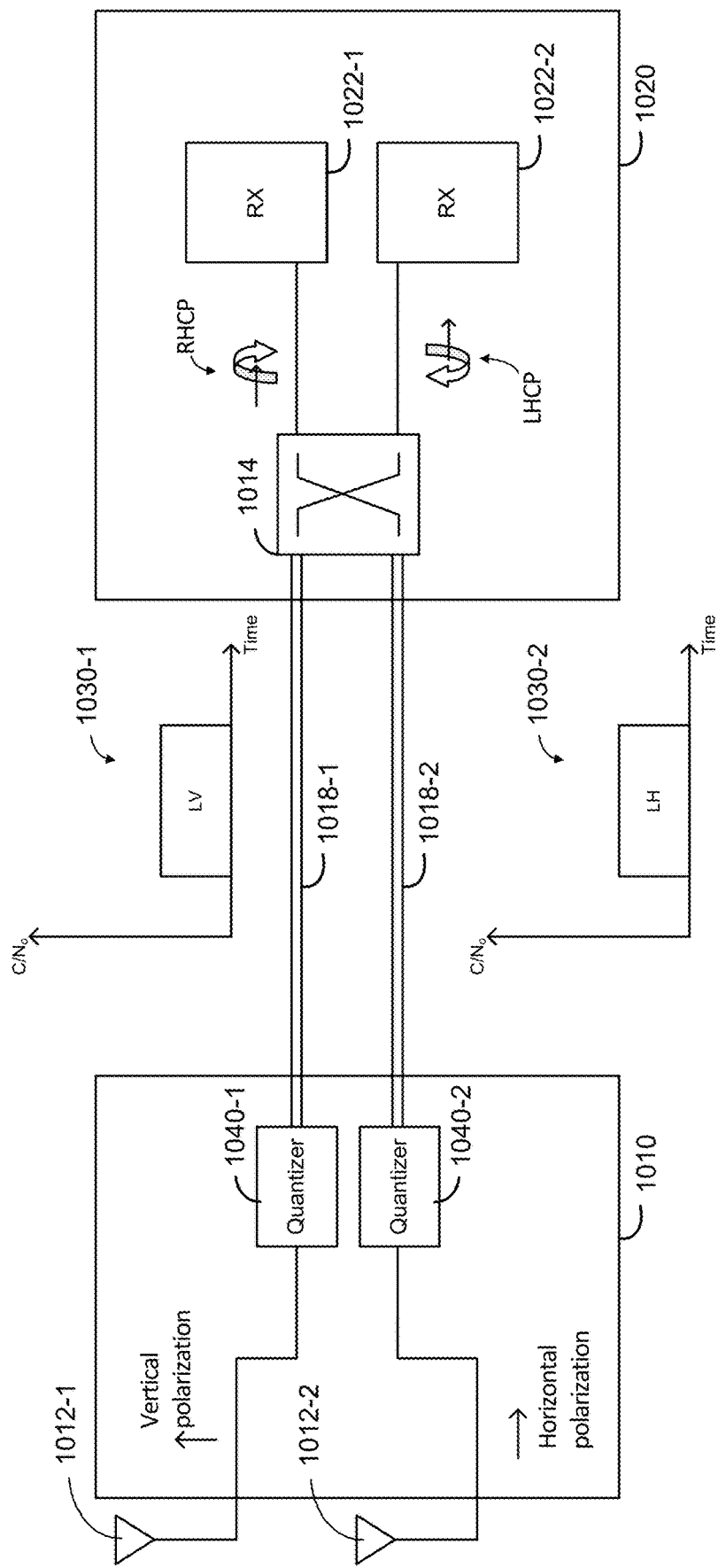
FIG. 10 illustrates a block diagram of a configuration of an antenna subsystem and a baseband subsystem of a wireless device, using two signal paths to transmit digitized, linearly polarized signals from the antenna subsystem to the baseband subsystem, according to one embodiment.

FIG. 10 is a block diagram of a configuration of an antenna subsystem 1010 and a baseband subsystem 1020 of a wireless device (e.g., a UE 105), according to another embodiment. The antenna subsystem 1010 may include a plurality of receiving antennas, such as two antennas 1012-1 and 1012-2 (collectively referred to as antennas 1012). In some embodiments, each of the antennas 1012-1 and 1012-2 may be configured to receive linearly polarized signals or signal components. In certain embodiments, each of the antennas 1012-1 and 1012-2 may be a planar inverted-F antenna (PIFA) type antenna. Antennas 1012 may be examples of the antennas 312 discussed with respect to FIG. 3.

The antenna subsystem 1010 may include quantizers 1040-1 and 1040-2 (collectively referred to as quantizers 1040) for antennas 1012. In some embodiments, each quantizer 1040 may be an analog-to-digital converters (ADC), configured to convert analog signals into digital signals, and may be an example of a quantizer 640 of FIG. 6. In some embodiments, each ADC 1040 may be configured to convert linearly polarized signals received by antennas 1012.

The antenna subsystem 1010 may be configured for digital data communication with the baseband subsystem 1020 and/or its components via two (or more) data buses 1018-1 and 1018-2 (collectively referred to as buses 1018), which may be examples of data buses 618-1 and 618-2 of FIG. 6.

The baseband subsystem 1020 may include an RF coupler 1014 that is configured to receive and combine inputs from the two antennas 1012. To this end, outputs from ADCs 1040 may be transmitted directly to the RF coupler 1014. In some embodiments, the RF coupler 1014 may be a 90-degree hybrid coupler, configured to receive two input signals (e.g., vertically polarized and horizontally polarized) and output combined phase-shifted signals, e.g., RHCP and LHCP signals. For example, digitized linearly polarized signals received from the antenna subsystem 1020 may be combined into circularly polarized signals, e.g., RHCP or LHCP signals. RHCP and LHCP signals may be received at one or more receivers, such as RF receiver modules 1022-1, 1022-2. Receiver modules 1022-1 and 1022-2 may be examples of receivers 622-1 and 622-2 of FIG. 6.

Using multiple data buses may allow increased throughput of data transferred between the antenna subsystem 1010 and the baseband subsystem 1020, as compared to using signal paths. Illustrative graphs 1030-1 and 1030-2 show that the entire transmission period for the data bus 1018-1 is occupied by LV signals and the entire transmission period for the data bus 1018-2 is occupied by LH signals.

Figure 11:
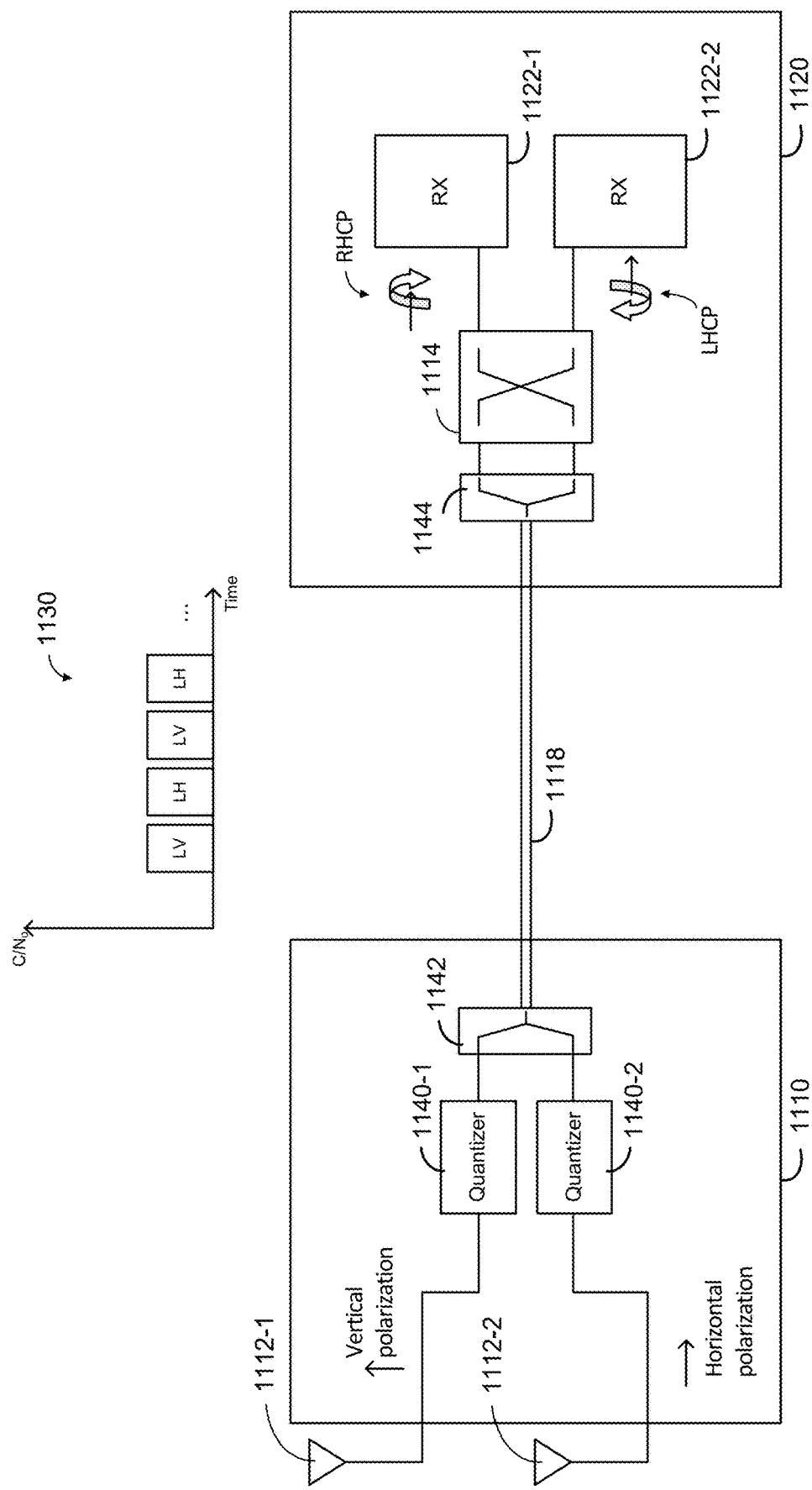
FIG. 11 illustrates a block diagram of a configuration of an antenna subsystem and a baseband subsystem of a wireless device, using one signal path to transmit digitized, linearly polarized signals from the antenna subsystem to the baseband subsystem, according to one embodiment.

FIG. 11 is a block diagram of a configuration of an antenna subsystem 1110 and a baseband subsystem 1120 of a wireless device (e.g., a UE 105), according to another embodiment. The antenna subsystem 1110 may include a plurality of receiving antennas, such as two antennas 1112-1 and 1112-2 (collectively referred to as antennas 1112). In some embodiments, each of the antennas 1112-1 and 1112-2 may be configured to detect linearly polarized signals or signal components. In certain embodiments, each of the antennas 1112-1 and 1112-2 may be a planar inverted-F antenna (PIFA) type antenna. Antennas 1112 may be examples of the antennas 312 discussed with respect to FIG. 3.

The antenna subsystem 1110 may include quantizers 1140-1 and 1140-2 (collectively referred to as quantizers 1140) for antennas 1112. In some embodiments, each quantizer 1140 may be an analog-to-digital converters (ADC), configured to convert analog signals into digital signals, and may be an example of a quantizer 740 of FIG. 7. In some embodiments, each ADC 1140 may be configured to convert linearly polarized signals received by antennas 1112.

The antenna subsystem 1110 may also include a digital combiner 1142, configured to combine multiple digital signals into one signal. Once quantized into digital form, the LV and LH signals can be combined in a myriad of ways and transmitted over a path 1118 from the antenna subsystem 1110 to the baseband subsystem 1120. Here, a combiner 1142 generally represents such an operation. For example, if the path 1118 is a data line or bus having sufficiently high data rate, the combiner 1142 can simply be implemented as a multiplexer that multiplexes the digitized LV and LH signals into one digital stream, which can be transmitted over the path 1118.

In some embodiments, the digital combiner 1142 may include or be coupled to a switch (not shown) such that the signals from the quantizers 1140 are time-multiplexed. The switch may be toggled at a constant rate, and may be an example of the switch 316 discussed with respect to FIG. 3. An illustrative graph 1130 shows that some time periods are occupied by converted RHCP signals and other time periods are occupied by converted LHCP signals in, e.g., a 1:1 ratio during transmission over the data bus 1118.

The baseband subsystem 1120 may include a digital splitter 1144, which reverses the combination performed by the digital combiner 1142. In some embodiments, the digital splitter 1144 may include another switch (not shown), which may be toggled synchronously at the same rate as the switch associated with the digital combiner 1142.

The baseband subsystem 1120 may further include an RF coupler 1114 that is configured to receive and combine inputs from the two antennas 1112. To this end, outputs from the digital splitter 1144 may be transmitted directly to the RF coupler 1114. In some embodiments, the RF coupler 1114 may be a 90-degree hybrid coupler, configured to receive two input signals (e.g., vertically polarized and horizontally polarized) and output combined phase-shifted signals, e.g., RHCP and LHCP signals. RHCP and LHCP signals may be received at one or more receivers, such as RF receiver modules 1122-1, 1122-2. Receiver modules 1122-1 and 1122-2 may be examples of receivers 722-1 and 722-2 of FIG. 7.

Figure 12:
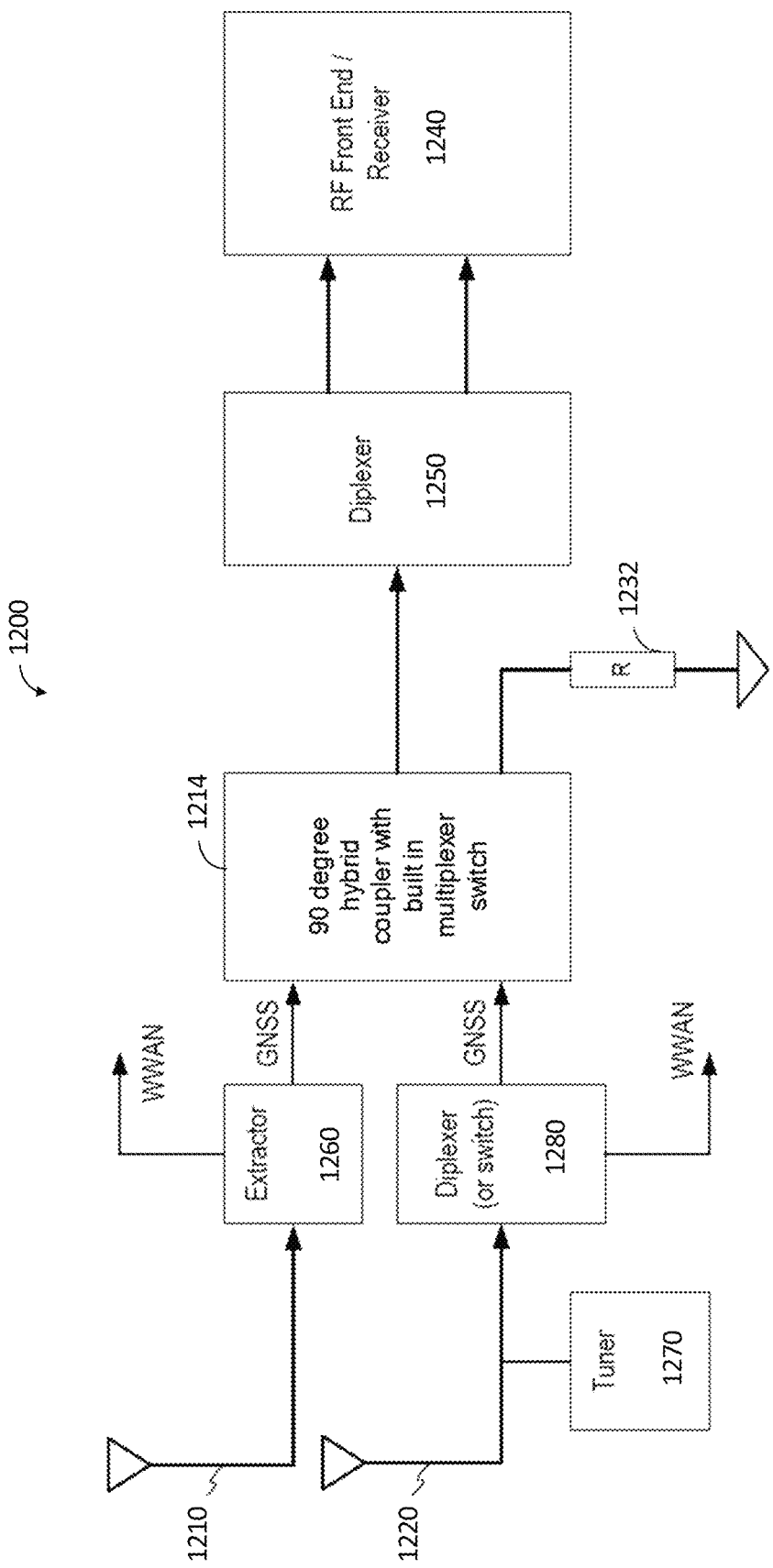
FIG. 12 illustrates a block diagram of a configuration of an antenna subsystem and a baseband subsystem of a wireless device, using an extractor, a diplexer, and/or a 90-degree hybrid coupler, according to one embodiment.

FIG. 12 illustrates a block diagram of a configuration of an antenna system 1200 of a wireless device (e.g., a UE 105), according to another embodiment. The antenna system 1200 may include a plurality of receiving antennas, such as two antennas 1210 and 1220. Each of these antennas 1210 and 1220 may be configured to detect linearly polarized signals or signal components. In certain embodiments, each of the antennas 1210 and 1220 may be a planar inverted-F antenna (PIFA) type antenna. Antennas 1210 and 1220 may be examples of the antennas 312 discussed with respect to FIG. 3.

In some embodiments, the antenna system 1200 may include at least one extractor 1260, at least one tuner 1270, at least one diplexer 1280, and a 90-degree hybrid coupler 1214. In some embodiments, the tuner 1270 and the diplexer 1280 may be substituted with another extractor and vice versa (i.e., the extractor 1260 may be substituted with another diplexer and/or another tuner). In other embodiments, the extractor 1260 and/or the diplexer 1280 may be substituted with a triplexer or an N-plexer with equal success. In certain embodiments, the diplexer 1280 may include or be substituted with a switch. The switch may be configured to toggle transmission of different types of signals to different components of the UE, e.g., GNSS signals to the 90-degree hybrid coupler 1214.

In some embodiments, the extractor 1260 may be configured to receive and remove multiple types wireless communication signals, e.g., WWAN and GNSS signals. For example, the extractor 1260 may extract the GNSS portion of the received signals and cause transmission of the GNSS signals to the 90-degree hybrid coupler 1214. The extractor 1260 may also extract the WWAN portion of received signals and cause transmission to another component or subsystem (not shown) of the UE which are sharing the antenna 1210.

Alternatively, using signals received at antenna 1220 as an example, the tuner 1270 may be configured to tune or optimize the reception of the received signal to one used for or suitable for GNSS positioning signals. The diplexer 1280 may switch the signal transmission path to the 90-degree hybrid coupler 1214, rather than to another component or subsystem of the UE which are sharing the antenna 1220 (e.g., a WWAN subsystem, not shown).

In some embodiments, the 90-degree hybrid coupler 1214 is configured to receive and combine inputs (e.g., vertically polarized and horizontally polarized) from the two antennas 1210 and 1220 into an output signal having a different polarization type. For example, linearly polarized components obtained via the antennas 1210, 1220 may be combined to output into circularly polarized signals, e.g., RHCP or LHCP signals. The 90-degree hybrid coupler 1214 may also include a load resistor 1232 (e.g., a 50-ohm load resistor) to terminate reflections from the input components (extractor 1260 and diplexer 1280) and maintain a high isolation between the input ports.

The antenna system 1200 may also include a diplexer 1250 configured to separate two frequency bands of the incoming GNSS signals (such as L1 and L5). Each type of signal may be received and processed (e.g., demodulated) by respective receivers 1240. In some embodiments, the receivers 1240 may include distinct receiver modules, which may be examples of receivers 322-1 and 322-2 discussed with respect to FIG. 3.

Other embodiments and configurations of the components discussed above will become apparent to one having ordinary skill in the relevant art, and the concepts described herein are not strictly limited to the foregoing embodiments of FIGS. 3-12. Some components may be optional and additional components may be added for achieving similar results. Portions of one embodiment may be combined with portions of another embodiment.

Polarization Profiles

FIG. 13 is a table 1300 showing illustrative examples of determinations that may be made regarding multipath and classifications of environmental contexts based on right-handed and left-handed components of positioning signals. The table 1300 compares (i) environmental contexts or conditions, (ii) signal strength or attenuation of the right-handed circular polarization (RHCP) component of a received positioning signal, (iii) signal strength or attenuation of the left-handed circular polarization (LHCP) component of the received positioning signal, (iv) signal strength or attenuation of linear (LV or LH) components of the received signal, and/or (v) likely determinations that may be made based on these polarization profiles or behaviors. In these examples, C/No may be used to measure relative signal strengths of the positioning signals.

In some embodiments, to obtain these relative signal strengths, measurements of RHCP and LHCP components (and linear polarization if available) may be performed closely in time (ideally near simultaneously) and not separated by a significant temporal gap. This is to ensure that the signal environment is largely similar when the measurements are performed, and to get an accurate relative difference in signal strengths for the multipath indication. Depending on the use scenario, however, the measurements may be performed with different amounts of temporal gap. For example, if the UE is stationary, or if processing resources have been reduced or diverted elsewhere, the amount of time between polarization measurements may be more forgiving (larger). However, if the UE is moving (e.g., the user is walking or inside a vehicle), the UE may perform the measurements as closely as possible.

In example 1310, a received positioning signal is measured by the UE to have relative signal strengths of 0 dB for the RHCP component and −30 dB for the LHCP component (i.e., an attenuation of 30 dB relative to the RHCP component). RHCP and LHCP measurements may be obtained using any of the embodiments of FIGS. 3-12. Specifically, in some embodiments, the signal strengths measured in $C/N_0$ values may be determined by, e.g., one or more receivers, such as receivers 322. An indication of 0 dB may not necessarily correspond to a measurement of 0 dB but rather a reference level.

In some embodiments, relative values of signal strengths between RHCP and LHCP components are evaluated to make the multipath determination. For example, if the RHCP component of a signal had a greater signal strength than the LHCP component by a difference of 30 dB or more (e.g., 0 dB vs. −30 dB), or of another amount that indicates dominance of one component over the other, then the UE may determine with fair certainty that the signal was a line-of-sight (LOS) signal. Moreover, a difference of 30 dB may be considered considerably large when comparing RHCP and LHCP components. Although not dispositive to determination of multipath, the strength of a linear component may be detected in the signal as well, −3 dB in this case.

It is noted that the absolute value of the relative difference alone is a portion of a useful determination of presence of multipath. When comparing relative differences, the UE also determines which of the RHCP and LHCP components is larger. Since satellites conventionally emit RHCP positioning signals, the strong RHCP component and weak LHCP component indicate that the received signal most likely did not interact with surfaces in the environment (buildings, roads, etc.). That is, the positioning signal is likely in its original form.

Based on these RHCP and LHCP measurements of 0 and −30 dB, respectively, and the relatively large difference between the measurements, the UE may make a determination with respect to multipath. In this case, it can be determined that the received positioning signal likely had a LOS path; i.e., the signal was directly received from the SV (e.g., GNSS satellite) with no reflections and thus no multipath. Based on the determination, the positioning signals and/or the SV(s) emitting the signals may then be used or otherwise weighted heavily in position determination.

In some embodiments, elevation and azimuth angles for the emitting SV(s) may be taken into account in the determination of multipath. For example, data corresponding to elevation and azimuth angles may be used as additional data to train the UE or portions of the positioning system (e.g., the location server 160) using the aforementioned machine learning implementations. Determining algorithmic parameters and weights based on the angles of the SV(s) may enable further accuracy in determining multipath and/or classifications of the environmental context, e.g., on a per-SV basis.

In some implementations, other types of information may be used in conjunction to determine multipath. For example, rough locations may be obtained based on WLAN-(e.g., Wi-Fi) or cellular-based positioning, which may indicate that a UE is in a certain known area (e.g., downtown city streets with high likelihood of multipath).

In some implementations, the confidence level of multipath determination may also be improved based on prior measurement(s) or a "crowdsourced" database. More specifically, known information on polarization profiles (i.e., signal strengths of RHCP and LHCP components of positioning signals) versus the associated environmental context may indicate a pattern pertaining to a given polarization profile, thereby increasing the confidence of the inference of the environment if the same polarization profile has been determined. For example, a determination of an RHCP signal component of 0 to 5 dB and a relative LHCP signal component of −16 to −20 dB may have been determined by prior measurements and determinations by the UE or other UEs (e.g., in conjunction with the aforementioned other types of information in some implementations) to indicate an urban canyon with an even number of reflections. In that case, obtained measurements of −1 dB RHCP and −20 dB LHCP may fairly indicate multipath in an urban canyon with an even number of reflections, and cause de-weighting of the signal and/or the emitting SV. In some embodiments, the UE may be configured to contribute information related to detected signal strengths, multipath, and/or location (e.g., absolute or relative geodetic coordinates) as part of using the crowdsourced data.

In some implementations, the difference threshold may be predetermined or dynamically determined based on factors such as time of day, network congestion (e.g., other UEs in proximity or using the GNSS sending the signals), type of device, type of antennas used by the UE, or other characteristics of the UE. In some embodiments, the relative difference of the RHCP and LHCP measurements may be evaluated with respect to thresholds that are predetermined or dynamically determined based on these factors.

Referring now to example 1312, a received positioning signal is measured to have a relative RHCP component of 0 dB and some small relative LHCP component, e.g., between −15 and −25 dB, though in various implementations, this "small" range may be any range below 0 dB. In this case, the UE may make a determination with respect to multipath wherein a small amount of reflection (i.e., a low-angle reflection) occurred after the positioning signal was emitted from the satellite and before it reached the UE. Since the RHCP component remained large (0 dB), there was likely a LOS transmission with small multipath errors on the received signal. The signals and/or the SV(s) emitting the positioning signals would likely be weighted significantly in position determination.

In example 1314, a received positioning signal is measured to have a relative RHCP component of 0 dB and some large relative LHCP component, e.g., between −10 and 0 dB. A different range of values (−5 to 0 dB by way of example) may also be considered "large." In this case, the UE may make a determination with respect to multipath wherein relatively large reflections occurred after the positioning signal was emitted from the satellite and before it reached the UE. Since the LHCP component is large (near 0 dB relative to the RHCP component), there was likely a LOS transmission with large multipath errors on the received signal. Here, the UE may determine that multipath (likely to result in large errors) occurred, and thus de-weight or disregard the transmitting SV(s) and/or the positioning signal in the UE's location determination.

In example 1316, a received positioning signal is measured to have a relative RHCP component of −30 dB and 0 dB for the relative LHCP component. As noted elsewhere herein, reflection of a circularly polarized signal causes the polarization to change between right-handed and left-handed. Since GNSS satellites conventionally emit RHCP signals, receiving a signal having a weak RHCP component and a strong LHCP component is indicative of a reflection, e.g., an isolated tall building providing a surface from which the signal has reflected before arriving at the UE. In this case, the UE may reject or disregard the signal based on multipath. However, in some embodiments, although the presence of multipath has been detected, the UE may alternatively de-weight the SV(s) and/or the received signal to an extent, rather than entirely disregarding, since a single reflection is not likely to cause significant errors on the signal. Compare with example 1310, where relative RHCP was 0 dB and relative LHCP was −30 dB.

In example 1318, a received positioning signal is measured to have a small relative RHCP component and 0 dB for the relative LHCP component. Similar to example 1316, the large LHCP component indicates multipath reflections. More generally, signals that have reflected an odd number of times (1, 3, 5, etc.) may keep a larger LHCP component since the handedness of the signal will change upon each reflection. The UE may then infer the presence of multipath in an "urban canyon" environment with many surfaces (e.g., surrounded by tall buildings, inside a building in a busy commercial area, within a tunnel). The UE may de-weight or reject the SV(s) and/or the signal accordingly upon determining this polarization profile.

In example 1320, a received positioning signal is measured to have a relative RHCP component of 0 dB and a small relative LHCP component. A small absolute RHCP component may indicate that multipath and degradation of the signal may have occurred over an even number of times (2, 4, 6, etc.), causing further degradation of the signal (e.g., $C/N_0 < -30$ dB) or additive effects (e.g., $C/N_0 < -20$ and $C/N_0 > -30$ dB). Similar to example 1318, the UE may determine the presence of multipath in an "urban canyon" environment with many surfaces. The UE may de-weight or reject the SV(s) and/or the signal accordingly.

Finally, in example 1322, a mixture of small to large relative signal strength measurements for the RHCP and LHCP components may be determined. This may indicate a high likelihood that multipath has occurred with a significant amount of degradation of the initial positioning signal. This type of positioning signal may not be valuable to location determination, and thus, the UE may reject the SV(s) and/or the signal. In some embodiments, the SV(s) and/or the signal may be de-weighted instead.

Thus, relative signal strengths of RHCP, LHCP, as well as linear polarization results if available, may be used for multipath determination or assessment. Myriad other scenarios, combinations of polarizations, and conclusions will become apparent to those having ordinary skill in the art, the above examples being purely illustrative.

Data on these relationships between RHCP and LHCP polarizations of the received positioning signals and the likely determinations of multipath and the type of environment may be stored or accessible by the UE (e.g., wirelessly at a server, an access point, or a remote database), enabling one or more of the UE components (as shown in FIG. 13) to weight, de-weight, or reject certain SV(s) and/or positioning signals while performing location determination or location estimation. Generally, positioning signals that have experienced degradation (caused by, e.g., multipath) are more prone to error and thus less relevant for positioning, since data encompassed by positioning signals as discussed above, for example, may lose integrity after signal degradation. Therefore, positioning signals that have not experienced multipath are more useful and can provide additional support for an accurate and efficient position determination process.

However, positioning signals of any degree of RHCP and LHCP polarization that have been received by the UE may be highly relevant and useful for the location determination process. In the above examples, multipath detection was possible because of relationships between polarization characteristics and environmental context were previously determined by the UE 105 or another UE or device, and/or accessible locally on the UE or at another network device (e.g., an access point or a server). Thus, storing, or even "crowdsourcing" of polarization profiles by one or more UEs of the network, for example by having accessible data on polarization profiles via the network 170, may allow a given UE to quickly and efficiently determine the characteristics of its location and/or determine or estimate its location based at least on previously determined relationships between (i) signal strengths of the RHCP and LHCP polarization components of received positioning signals and (ii) location (e.g., a particular intersection of a downtown city area). Additionally, in some embodiments, if the GNSS pseudorange (e.g., determined based on the travel time of a positioning signal from the SV to the UE) associated with a first signal having one predominant polarization type (e.g., RHCP component) is determined to be longer than the pseudorange associated with another signal having another predominant polarization type (e.g., LHCP component), then it may indicate that the first signal did not take a direct path, and may indicate a multipath-degraded signal based thereon. Therefore, the UE may not only determine an indication of multipath based on signal strengths, but the UE may contribute information related to detected signal strengths, pseudoranges, and location (e.g., absolute or relative geodetic coordinates). Such information may be transmitted to, e.g., the location server 160, or stored more locally at an access point.

Example Techniques

Figure 14:
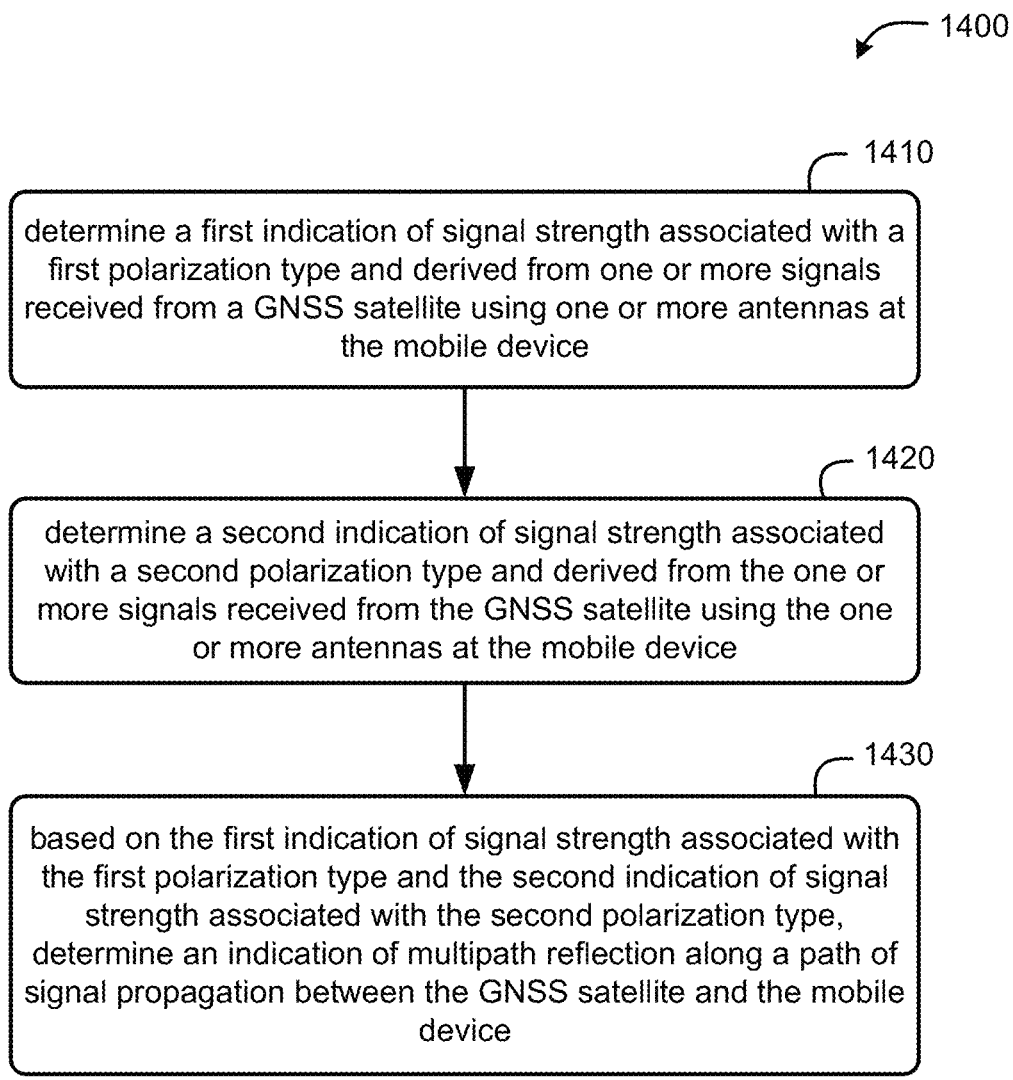
FIG. 14 illustrates a flow diagram of a method of determining the presence of multipath during positioning of a mobile device, according to one embodiment.
Figure 16:
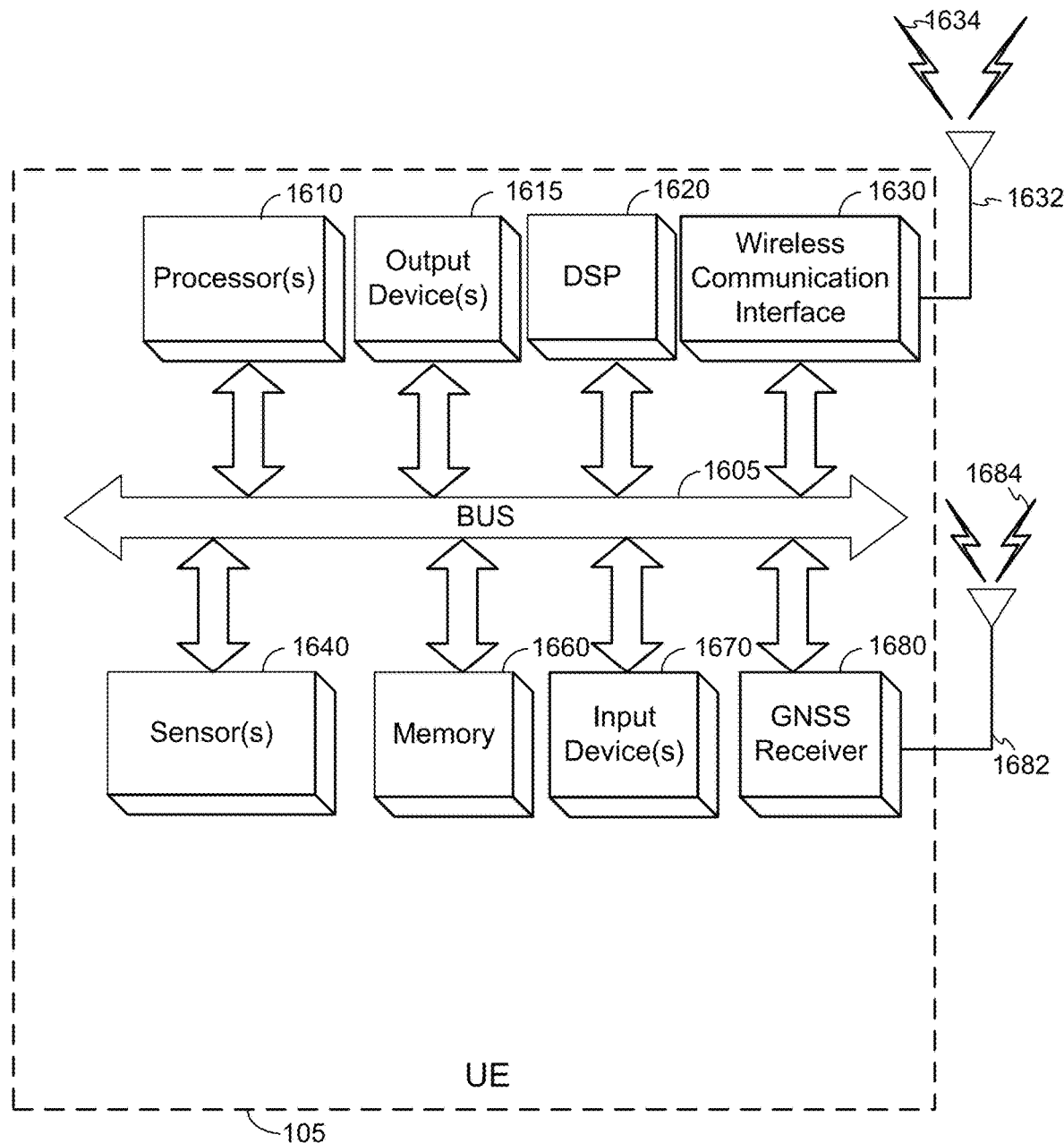
FIG. 16 is a block diagram of an embodiment of a UE, which can be utilized in embodiments as described herein.

FIG. 14 is a flow diagram of a method 1400 of determining the presence of multipath during positioning of a mobile device, according to one embodiment. One or more of the functions of the method 1400 may be performed by a wireless device (e.g., UE 105) that is capable of receiving positioning signals an SV (e.g., GNSS satellite). Means for performing the functionality illustrated in one or more of the blocks shown in FIG. 14 may include hardware and/or software components of a UE such as the UE 105 shown in FIGS. 1 and 2. Example components of a UE are illustrated in FIG. 16, which are described in more detail elsewhere herein.

At step 1410 of the method 1400, the functionality includes determining a first indication of a signal strength associated with a first polarization type and derived from one or more signals received from at least one SV (e.g., a GNSS satellite) using one or more antennas at the mobile device. The signal strength may be measured from one or more positioning signals received from a GNSS satellite using the antennas of a mobile device (e.g., UE 105). The UE may utilize linearly polarized antennas such as those discussed above (e.g., antennas 312) to detect positioning signals from the GNSS satellite. For example, a vertically polarized component of a signal may be detected by one antenna on the UE, and a horizontally polarized component of the signal may be detected by another antenna on the UE. The vertical and horizontal components may be inputted into an RF coupler (e.g., a 90-degree hybrid coupler) to generate a circularly polarized signal. The outputted circularly polarized signal may be transmitted to a baseband subsystem for measurement of signal strength of the first polarization type, e.g., the right-handed polarization component. The signal strength may be determined and measured by a receiver (e.g., receiver 322) in terms of $C/N_0$ (dB).

In another embodiment, at least one of the antennas may be configured to detect circularly polarized signals directly. At least one of the antennas may be an RHCP antenna or an LHCP antenna respectively configured to detect and receive RHCP signals or LHCP signals. The signal strength of the first polarization type (e.g., right-handed) of the circularly polarized signal may be transmitted to and determined by the baseband subsystem.

Given that positioning signals are emitted as RHCP signals, multipath caused by reflection from various surfaces in the local environment on the surface of the globe may cause the received signals to be at least partly right-handed and at least partly left-handed as previously discussed.

To that end, at step 1420 of the method 1400, the functionality includes determining a second indication of a signal strength associated with a second polarization type and derived from the one or more signals received from the GNSS satellite using the one or more antennas at the mobile device. Similar to step 1410, the UE may measure the signal strength (e.g., $C/N_0$) of the second polarization type, e.g., the left-handed component of signals received by the one or more antennas. In some cases, the signal strength of the LHCP component may be significant, while in some cases, the signal strength may be negligible. The LHCP signal strength may vary from small to large, as shown in the examples of FIG. 13.

At step 1430, the functionality includes, based on the first indication of signal strength associated with the first polarization type (from step 1410), and the second indication of signal strength associated with the second polarization type (from step 1420), determining an indication of multipath reflection along a path of signal propagation between the GNSS satellite and the mobile device. In one embodiment, the first indication of signal strength associated with the first polarization type may include a first $C/N_0$ value for the right-handed component of a received signal, and the second indication of signal strength associated with the second polarization type may include a second $C/N_0$ value for the left-handed component of a received signal. The indication of multipath may be determined based on the first and second $C/N_0$ values. More specifically, in some embodiments, the relative signal strengths of the RHCP and LHCP polarization types enable determination of multipath and an inference of environmental context, as discussed with respect to FIG. 13.

In one example scenario, the measurement by the UE 105 may indicate, based on the first and second indications of signal strength of the received signal, that a received positioning signal has a large right-handed component (e.g., relative 0 dB) and a small left-handed component (e.g., −30 dB), which may indicate that the positioning signal was likely received in a line of sight from the SV with minimal to no reflections (i.e., no multipath), and that the positioning signal and/or the SV emitting this positioning signal should be weighted heavily for position determination.

In another example scenario, the received positioning signal may have a small right-handed component and a large left-handed component. The presence of a strong left-handed polarization indicates multipath in the positioning signal. This type of positioning signal might be used in location determination by a prior positioning system that is not using the methodology described herein. However, the present disclosure may consider this signal to be under the influence of multipath and thus not relevant to accurately determining its position. That is, even though the left-handed component of the signal is strong, the methodology described in the present disclosure does not necessarily find it valuable for position determination because the presence of a strong left-handed component is an indication that the positioning signal may have degraded due to multipath. The UE may thus de-weight the transmitting SV(s) and/or the positioning signal, or completely disregard this type of positioning signal in its location solution.

Figure 17:
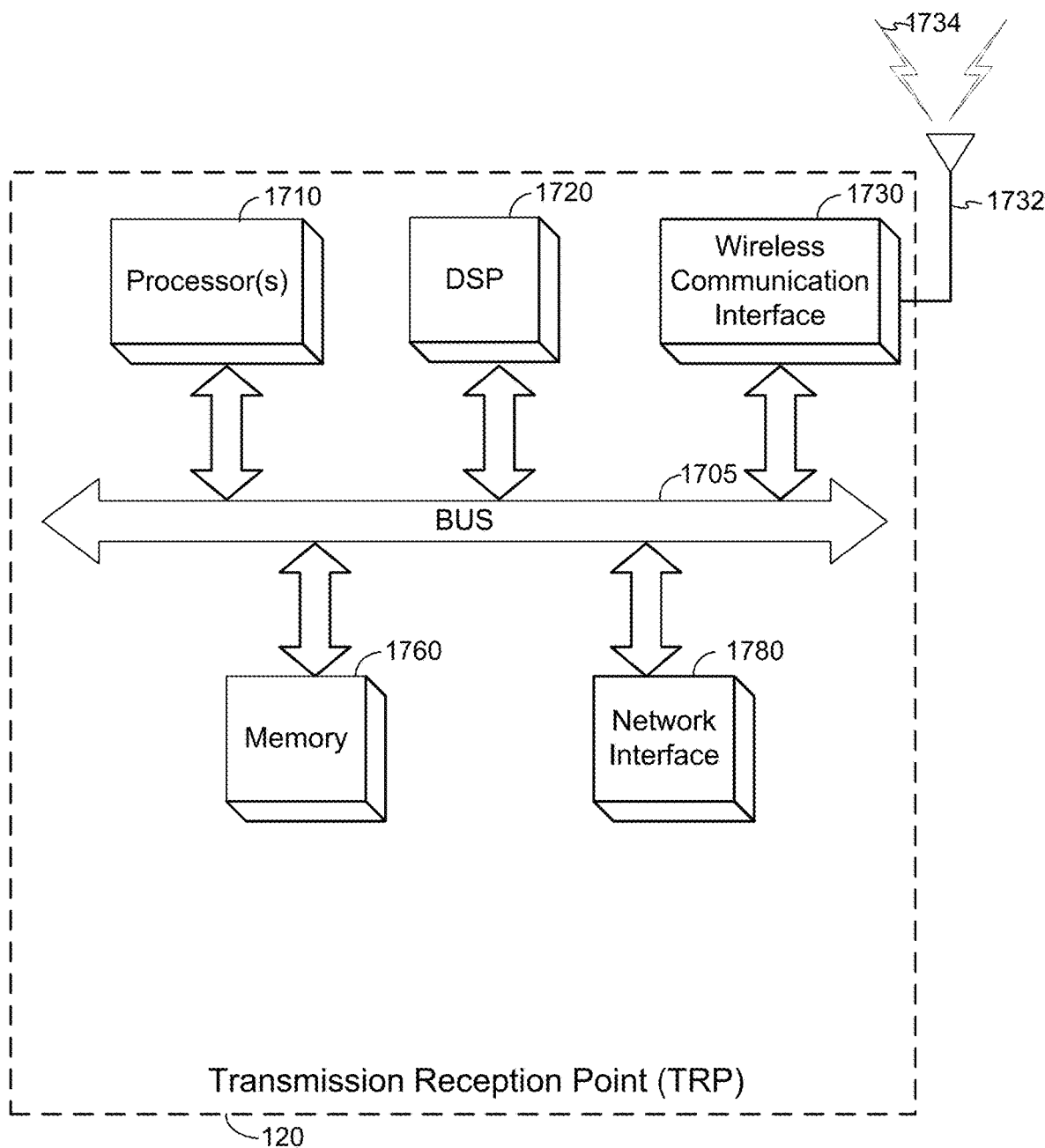
FIG. 17 is a block diagram of an embodiment of an enhanced repeater apparatus, which can be utilized in embodiments as described herein.

In many embodiments, means for performing functionality at steps 1410, 1420 and 1430 may comprise a signal path or a bus 1605, processor(s) 1610, digital signal processor (DSP) 1620, GNSS receiver 1680, one or more antennas 1682, and/or other components of a UE, as illustrated in FIG. 16. In some embodiments, means for performing functionality at steps 1410, 1420 and 1430 may comprise a signal path or a bus 1705, processor(s) 1710, DSP 1720, and wireless communication antenna(s) 1732, and/or other components of Transmission Reception Point (TRP), as illustrated in FIG. 17. A TRP may be part of an access point such as base station 120 or AP 130 that detects signals on behalf of the UE 105 and provides location estimation data for the UE 105.

Figure 15:
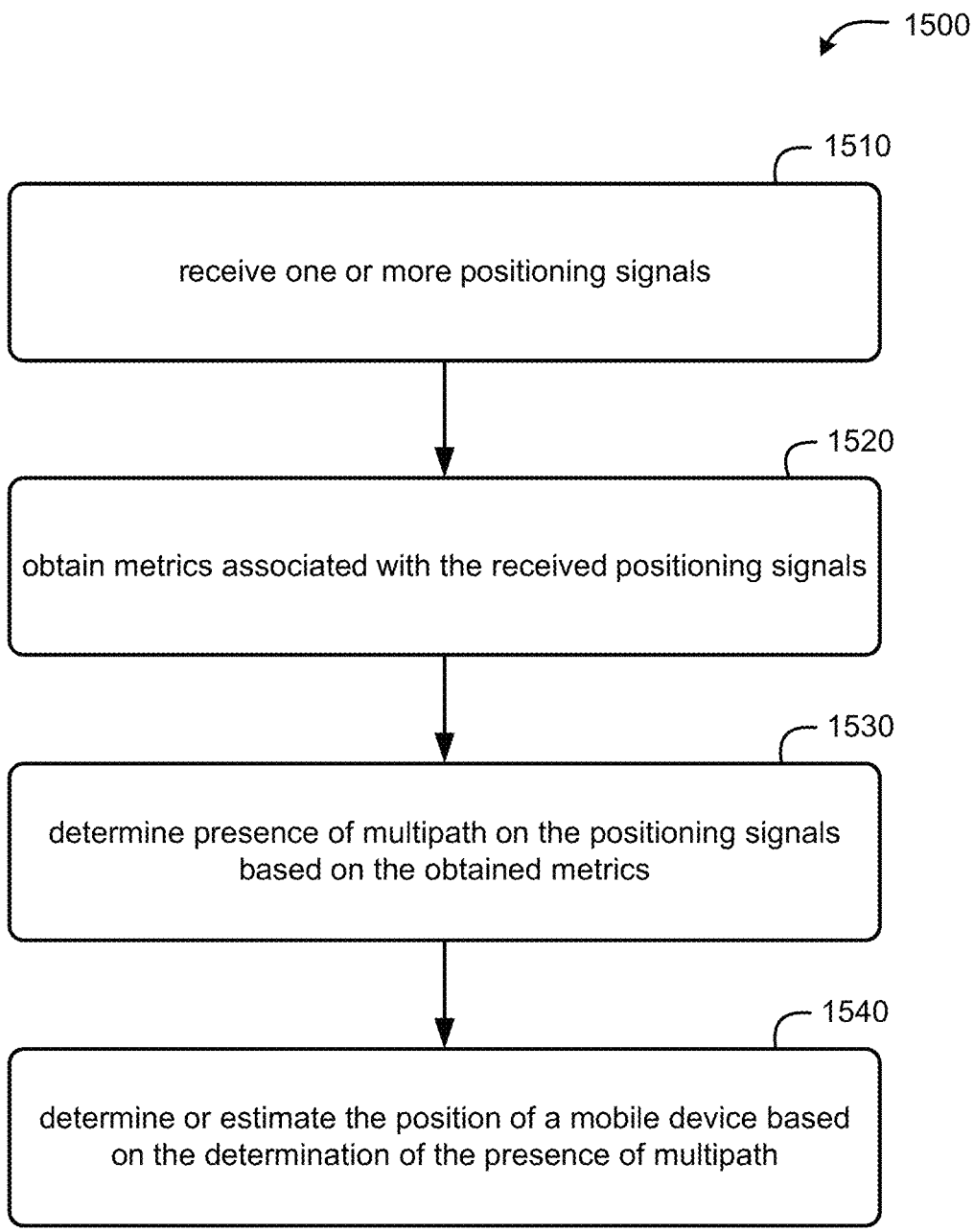
FIG. 15 illustrates a flow diagram of a method of determining the presence of multipath during positioning of a mobile device, according to another embodiment.

FIG. 15 is a flow diagram of a method 1500 of determining the presence of multipath during positioning of a mobile device, according to another embodiment. One or more of the functions of the method 1500 may be performed by a wireless device (e.g., UE 105) that is capable of receiving positioning signals an SV (e.g., GNSS satellite). Means for performing the functionality illustrated in one or more of the blocks shown in FIG. 15 may include hardware and/or software components of a UE such as the UE 105 shown in FIGS. 1 and 2. Example components of a UE are illustrated in FIG. 16, which are described in more detail elsewhere herein.

At step 1510, the method may include receiving one or more positioning signals. In some embodiments, the positioning signals are emitted from at least one SV (e.g., GNSS satellite). The positioning signals may be detected by one or more antennas of the UE.

At step 1520, the method may include obtaining metrics associated with the received positioning signals. In some embodiments, the metrics may include indications relating to polarization types, which may include circular polarization components of the received positioning signals, i.e., RHCP and LHCP components. The metrics to measure the circular polarization components may include signal strengths represented by $C/N_0$ values measured in dB. In some embodiments, the $C/N_0$ values may be determined by receivers (e.g., 322) of a baseband subsystem. In alternate embodiments, the metrics may include data indicative of the pseudorange associated with a positioning signal.

At step 1530, the method may include determining presence of multipath on the positioning signals based on the obtained metrics. In some embodiments, the metrics (e.g., $C/N_0$ values) may be compared relative to each other. For example, the relative $C/N_0$ values may be −30 dB on the RHCP component of the received positioning signals and 0 dB on the LHCP component. This may result in a determination of multipath, and further result in an inference that a single reflection occurred from a surface. Other comparisons between RHCP and LHCP components may reveal other types of environmental context (urban canyon, open-field line of sight, etc.), as discussed with respect to FIG. 13. In some embodiments, the pseudorange associated with a signal having RHCP polarization may be compared to the pseudorange associated with a signal having LHCP polarization, and any difference between the pseudoranges may indicate the presence of multipath. For example, if the RHCP pseudorange indicates a longer path than the LHCP (or linear) pseudorange, this may be indicative of the RHCP signal being a multipath-degraded signal.

In some embodiments, the relationships between $C/N_0$ values and environmental context may already exist from prior "crowdsourced" data that is accessible via a network (e.g., stored and maintained in a base station 120 or the location server 160). Such data may contain known information on polarization profiles (i.e., signal strengths of RHCP and LHCP components of positioning signals) and the associated environmental context. Such crowdsourced data may assist with the determination of the presence of multipath by improving a confidence level of the determination, as described with respect to FIG. 13.

At step 1540, the method may include determining or estimating the position of the mobile device based on the determination of the presence of multipath. In some embodiments, determining or estimating the position includes determining a utilization plan for the signals from the GNSS satellite, based on the indication of multipath reflection between the GNSS satellite and the mobile device, or the extent to which multipath has affected the positioning signals. The received positioning signals (or a position fix derived from the signals) and/or the SV(s) that have emitted the signals may be assigned a weight in the location solution, or the signals and/or the SV(s) may be de-weighted or disregarded in the location solution.

It will be appreciated that some or all of the above steps of FIG. 15 may be performed by a network entity other than the UE (e.g., TRP) for the determination of multipath and location with respect to a given UE.

Additional Use Cases

In some implementations, the configurations and methods described herein may be used to determine the presence of a signal spoofing source.

Spoofing refers to obscuring of a location, such as a location of a UE or a moving vehicle (e.g., a ship). One type of spoofing may involve transmission and/or delayed retransmission of GNSS signals from a single transmitting antenna. A target receiver that detects such GNSS signals may appear to be in a location different from the actual location of the target receiver. A spoofing source may appear to be in a different location to a monitoring system.

Spoofed signals retain their multipath characteristics (e.g., polarization profiles). Hence, with the various antenna configurations and determination methodologies described above where RHCP and LHCP signals are measured, a receiver may be able to distinguish spoofed signals from true signals. For true signals, the signals are being transmitted from different SVs at different elevation and azimuth angles, and hence will have different polarization characteristics between each one. For spoofed signals, the spoofing source antenna may be configured to emit RH, LH, or linear signals. However, the polarization characteristics for all SVs will be nearly identical, for the same carrier frequency (e.g., L1 or L5). For example, RHCP-to-LHCP signal strength ratios and/or relative peak locations will be very similar because of the similar multipath signatures from the spoofing source.

Therefore, by determining the polarization characteristics and associated multipath signatures based on the measurements, and evaluating them for a similarity level, a receiver may determine whether the GNSS signals may be spoofed. For example, RHCP and LHCP components may be measured for signals from each SV and compared to see if they are within an unacceptable range; e.g., variations of less than 1 dB among readings may indicate a possibility of spoofing. The amount of variation may be determined based on specific usage scenarios.

In some scenarios, strong in-band jamming may affect certain frequencies (e.g., L1 or L5). For example, a re-transmitter device (i.e., a jammer) may be installed to boost GNSS signals inside a vehicle because a user may experience signals that do not appear to be strong enough, e.g., inside a vehicle or enclosure. The user may desire stronger GPS signals but not aware of the impact such excessively strong signals may have on a UE's circuitry. The re-transmitter device may receive and amplify only GPS L1 signals and re-radiate those signals into the vehicle. However, this very strong signal (amplified by, e.g., 40-50 dB) can saturate and thereby desensitize the L1 receiver on a UE.

To prevent the saturation of the L1 receiver saturation, the polarization of the re-radiated signals may be detected. The re-radiated signals likely will not have the same polarization as the incoming L1 signal (which is mainly RHCP). Hence, signal paths corresponding to the detected polarization of the re-radiated signals may be downregulated or otherwise sampled less. As an example, if the re-radiated signals are determined to have an RHCP component of 10 dB and LHCP component of 30 dB, a switch (e.g., 316) may toggle so as to sample more of the RHCP signals than the LHCP signals, and/or, the receiver(s) at the UE may reduce the contributions from the suspect signals to the overall position solution. The polarization for the L1 antenna may be changed independently of other receivers (such as L5) to attenuate the re-radiated signals.

In some cases, if the UE determines that polarization characteristics from re-radiated signals are similar, then the UE may determine that the signals are coming from one source, i.e., the jammer. The UE may respond similarly, e.g., reduce contributions from the suspect signals and/or sample more RHCP signals.

This is an application of the techniques described herein which is opposite to determining the polarization. Farther than best receiving the signal, in this scenario, a powerful signal can be reduced or attenuated according to the polarization.

Example System Configurations

FIG. 16 illustrates an embodiment of a UE 105, which can be utilized as described herein above. For example, the UE 105 can perform one or more of the functions of the method shown in FIGS. 14 and 15. It should be noted that FIG. 16 is meant only to provide a generalized illustration of various components, any or all of which may be utilized as appropriate. It can be noted that, in some instances, components illustrated by FIG. 16 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 16.

The UE 105 is shown comprising hardware elements that can be electrically coupled via a bus 1605 (or may otherwise be in communication, as appropriate). The hardware elements may include a processor(s) 1610 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1610 may comprise one or more processing units, which may be housed in a single integrated circuit (IC) or multiple ICs. As shown in FIG. 16, some embodiments may have a separate DSP 1620, depending on desired functionality. Location determination and/or other determinations based on wireless communication may be provided in the processor(s) 1610 and/or wireless communication interface 1630 (discussed below). The UE 105 also can include one or more input devices 1670, which can include without limitation one or more keyboards, touch screens, touch pads, microphones, buttons, dials, switches, and/or the like; and one or more output devices 1615, which can include without limitation one or more displays (e.g., touch screens), light emitting diodes (LEDs), speakers, and/or the like.

The UE 105 may also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1630 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1632 that send and/or receive wireless signals 1634. According to some embodiments, the wireless communication antenna(s) 1632 may comprise a plurality of discrete antennas, antenna arrays, or any combination thereof. The antenna(s) 1632 may be capable of transmitting and receiving wireless signals using beams (e.g., Tx beams and Rx beams). Beam formation may be performed using digital and/or analog beam formation techniques, with respective digital and/or analog circuitry. The wireless communication interface 1630 may include such circuitry.

Depending on desired functionality, the wireless communication interface 1630 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1640. Sensor(s) 1640 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1680 capable of receiving signals 1684 from one or more GNSS satellites using an antenna 1682 (which could be the same as antenna 1632 or the antenna 312). Positioning based on GNSS signal measurement can be utilized to complement and/or incorporate the techniques described herein. The GNSS receiver 1680 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1680 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1680 is illustrated in FIG. 16 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1610, DSP 1620, and/or a processor within the wireless communication interface 1630 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1610 or DSP 1620.

The UE 105 may further include and/or be in communication with a memory 1660. The memory 1660 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1660 of the UE 105 also can comprise software elements (not shown in FIG. 16), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1660 that are executable by the UE 105 (and/or processor(s) 1610 or DSP 1620 within UE 105). In some embodiments, then, such code and/or instructions can be used to configure and/or adapt a general-purpose computer (or other device) to perform one or more operations in accordance with the described methods.

FIG. 17 illustrates an embodiment of a base station 120, which can be utilized in conjunction with some embodiments as described above. It should be noted that FIG. 17 is meant only to provide a generalized illustration of various components, any or all of which may be utilized as appropriate. In some embodiments, the base station 120 may correspond to a gNB, an ng-eNB, and/or (more generally) a TRP.

While many of the embodiments describe multipath estimation by a UE, the same techniques may be used by a base station for multipath estimation. For example, knowing the multipath environment at the base station may be used with the abovementioned crowdsourcing (e.g., by storing data accessible to nearby UEs).

The base station 120 is shown comprising hardware elements that can be electrically coupled via a bus 1705 (or may otherwise be in communication, as appropriate). The hardware elements may include a processor(s) 1710 which can include without limitation one or more general-purpose processors, one or more special-purpose processors (such as DSP chips, graphics acceleration processors, ASICs, and/or the like), and/or other processing structure or means. As shown in FIG. 17, some embodiments may have a separate DSP 1720, depending on desired functionality. Location determination and/or other determinations based on wireless communication may be provided in the processor(s) 1710 and/or wireless communication interface 1730 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1730 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1732 that send and/or receive wireless signals 1734. These wireless communication antenna(s) may include the antenna(s) 312.

The base station 120 may also include a network interface 1780, which can include support of wireline communication technologies. The network interface 1780 may include a modem, network card, chipset, and/or the like. The network interface 1780 may include one or more input and/or output communication interfaces to permit data to be exchanged with a network, communication network servers, computer systems, and/or any other electronic devices described herein.

In many embodiments, the base station 120 may further comprise a memory 1760. The memory 1760 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1760 of the base station 120 also may comprise software elements (not shown in FIG. 17), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1760 that are executable by the base station 120 (and/or processor(s) 1710 or DSP 1720 within base station 120). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method for multipath estimation at a mobile device, comprising: determining a first indication of signal strength associated with a first polarization type and derived from one or more signals received from a GNSS satellite using one or more antennas at the mobile device; determining a second indication of signal strength associated with a second polarization type and derived from the one or more signals received from the GNSS satellite using the one or more antennas at the mobile device; and based on the first indication of signal strength associated with the first polarization type and the second indication of signal strength associated with the second polarization type, determining an indication of multipath reflection along a path of signal propagation between the GNSS satellite and the mobile device.

Clause 2: The method of clause 1, further comprising: determining a utilization plan for signals associated with the GNSS satellite, based on the indication of multipath reflection between the GNSS satellite and the mobile device.

Clause 3: The method of any of clauses 1-2 wherein the utilization plan comprises assigning a weight to signals or a position fix derived from signals from the GNSS satellite in estimating a position for the mobile device.

Clause 4: The method of any of clauses 1-3 wherein the utilization plan comprises utilizing signals from the GNSS satellite for estimating a position for the mobile device.

Clause 5: The method of any of clauses 1-4 wherein the utilization plan comprises utilizing signals based on communication protocols other than the GNSS satellite for estimating a position for the mobile device.

Clause 6: The method of any of clauses 1-5 wherein the utilization plan is further applied to signals from one or more other GNSS satellites from one or more GNSS constellations.

Clause 7: The method of any of clauses 1-6 further comprising receiving a right-handed circularly polarized (RHCP) signal and a left-handed circularly polarized (LHCP) signal, as time-multiplexed signals, over a single signal path from an antenna subsystem; generating the first indication of signal strength associated with the first polarization type from the RHCP signal; and generating the second indication of signal strength associated with the second polarization type from the LHCP signal.

Clause 8: The method of any of clauses 1-7 further comprising receiving a right-handed circularly polarized (RHCP) signal over a first signal path from an antenna subsystem; receiving a left-handed circularly polarized (LHCP) signal over a second signal path from the antenna subsystem; generating the first indication of signal strength associated with the first polarization type from the RHCP signal; and generating the second indication of signal strength associated with the second polarization type from the LHCP signal.

Clause 9: The method of any of clauses 1-8 further comprising receiving a first linearly polarized signal over a first signal path from an antenna subsystem; receiving second linearly polarized signal over a second signal path from the antenna subsystem; converting the first linearly polarized signal and the second linearly polarized signal to a right-handed circularly polarized (RHCP) signal and a left-handed circularly polarized (LHCP) signal; generating the first indication of signal strength associated with the first polarization type from the RHCP signal; and generating the second indication of signal strength associated with the second polarization type from the LHCP signal.

Clause 10: The method of any of clauses 1-9 further comprising receiving a right-handed circularly polarized (RHCP) signal and a left-handed circularly polarized (LHCP) signal, as frequency-multiplexed signals, over a single signal path from an antenna subsystem; generating the first indication of signal strength associated with the first polarization type from the RHCP signal; and generating the second indication of signal strength associated with the second polarization type from the LHCP signal.

Clause 11: The method of any of clauses 1-10 further comprising controlling one or more switches to select, at a first time, the one or more signals received from the GNSS satellite and select, at a second time, one or more wide-area-network (WAN) signals received at the mobile device using the one or more antennas.

Clause 12: The method of any of clauses 1-11 further comprising receiving a right-handed circularly polarized (RHCP) signal and a left-handed circularly polarized (LHCP) signal as digital data; generating the first indication of signal strength associated with the first polarization type from the RHCP signal; and generating the second indication of signal strength associated with the second polarization type from the LHCP signal.

Clause 13: The method of any of clauses 1-12 wherein the determining of the indication of multipath reflection is further based on a relative comparison between the first indication of signal strength associated with the first polarization type and the second indication of signal strength associated with the second polarization type.

Clause 14: The method of any of clauses 1-13 wherein the determining of the indication of multipath reflection is further based on prior measurement data relating to the first indication of signal strength associated with the first polarization type and the second indication of signal strength associated with the second polarization type, the prior measurement data having been obtained by other mobile devices and being accessible to the mobile device.

Clause 15: The method of any of clauses 1-14 further comprising determining a polarization profile based on the first indication of signal strength associated with the first polarization type and the second indication of signal strength associated with the second polarization type, the polarization profile comprising a relationship among the first indication of signal strength, the second indication of signal strength, a multipath characteristic associated with the one or more signals received from the GNSS satellite, and an environmental context.

Clause 16: The method of any of clauses 1-15 further comprising determining, based at least on the polarization profile and the indication of multipath reflection, a presence of a signal spoofing source associated with the one or more signals received from the GNSS satellite.

Clause 17: The method of any of clauses 1-16 further comprising determining, based on the first indication of signal strength associated with the first polarization type and the second indication of signal strength associated with the second polarization type, an amplification of the one or more signals received from the GNSS satellite; and responsive to the determining of the amplification of the one or more signals, mitigating the amplification by adjusting receipt of at least one of the first polarization type or the second polarization type.

Clause 18: A user equipment comprising: a baseband subsystem; an antenna subsystem configured for signal communication with a baseband subsystem, the antenna subsystem comprising a first antenna, a second antenna, and a radio frequency (RF) coupler configured to receive signal inputs from the first antenna and the second antenna to output a signal having a first polarization type and a signal having a second polarization type; and a processor, communicatively connected to the baseband subsystem, the processor configured to: determine a first indication of signal strength associated with the first polarization type and derived from one or more signals received from a GNSS satellite using the antenna subsystem; determine a second indication of signal strength associated with the second polarization type and derived from the one or more signals received from the GNSS satellite using the antenna subsystem; and based on the first indication of signal strength associated with the first polarization type and the second indication of signal strength associated with the second polarization type, determine an indication of multipath reflection along a path of signal propagation between the GNSS satellite and the user equipment.

Clause 19: The user equipment of clause 18, wherein the baseband subsystem comprises a first receiver and a second receiver, the first receiver configured to determine the first indication of signal strength associated with the first polarization type, the second receiver configured to determine the second indication of signal strength associated with the second polarization type.

Clause 20: The user equipment of any of clauses 18-19 wherein the first antenna is configured to detect a signal component having a vertical polarization; the second antenna is configured to detect a signal component having a horizontal polarization; and the RF coupler is further configured to combine the signal component having the vertical polarization and the signal component having the horizontal polarization to output a circularly polarized signal, the circularly polarized signal comprising a right-handed circularly polarized (RHCP) signal component and a left-handed circularly polarized (LHCP) signal component.

Clause 21: The user equipment of any of clauses 18-20 wherein the processor is further configured to: receive a right-handed circularly polarized (RHCP) signal and a left-handed circularly polarized (LHCP) signal, as time-multiplexed signals, over a single signal path from the antenna subsystem; generate the first indication of signal strength associated with the first polarization type from the RHCP signal; and generate the second indication of signal strength associated with the second polarization type from the LHCP signal.

Clause 22: The user equipment of any of clauses 18-21 wherein the processor is further configured to: receive a right-handed circularly polarized (RHCP) signal and a left-handed circularly polarized (LHCP) signal, as frequency-multiplexed signals, over a single signal path from the antenna subsystem; generate the first indication of signal strength associated with the first polarization type from the RHCP signal; and generate the second indication of signal strength associated with the second polarization type from the LHCP signal.

Clause 23: The user equipment of any of clauses 18-22 wherein the determination of the indication of multipath reflection is further based on a relative comparison between the first indication of signal strength associated with the first polarization type and the second indication of signal strength associated with the second polarization type.

Clause 24: A non-transitory computer-readable apparatus comprising a storage medium, the storage medium comprising a plurality of instructions to, when executed by a processor, cause a mobile device to: determine a first indication of signal strength associated with a first polarization type and derived from one or more signals received from a GNSS satellite using one or more antennas at the mobile device; determine a second indication of signal strength associated with a second polarization type and derived from the one or more signals received from the GNSS satellite using the one or more antennas at the mobile device; and based on the first indication of signal strength associated with the first polarization type and the second indication of signal strength associated with the second polarization type, determine an indication of multipath reflection along a path of signal propagation between the GNSS satellite and the mobile device.

Clause 25: The non-transitory computer-readable apparatus of clause 24, further comprising instructions to, when executed by the processor, cause the mobile device to: receive a right-handed circularly polarized (RHCP) signal and a left-handed circularly polarized (LHCP) signal, as time-multiplexed signals, over a single signal path from an antenna subsystem; generate the first indication of signal strength associated with the first polarization type from the RHCP signal; and generate the second indication of signal strength associated with the second polarization type from the LHCP signal.

Clause 26: The non-transitory computer-readable apparatus of any of clauses 24-25, further comprising instructions to, when executed by the processor, cause the mobile device to: receive a right-handed circularly polarized (RHCP) signal and a left-handed circularly polarized (LHCP) signal, as frequency-multiplexed signals, over a single signal path from an antenna subsystem; generate the first indication of signal strength associated with the first polarization type from the RHCP signal; and generate the second indication of signal strength associated with the second polarization type from the LHCP signal.

Clause 27: The non-transitory computer-readable apparatus of any of clauses 24-26 wherein the determination of the indication of multipath reflection is further based on a relative comparison between the first indication of signal strength associated with the first polarization type and the second indication of signal strength associated with the second polarization type.

Clause 28: A computerized apparatus comprising: means for determining a first indication of signal strength associated with a first polarization type and derived from one or more signals received from a GNSS satellite using one or more antennas; means for determining a second indication of signal strength associated with a second polarization type and derived from the one or more signals received from the GNSS satellite using the one or more antennas; and means for, based on the first indication of signal strength associated with the first polarization type and the second indication of signal strength associated with the second polarization type, determining an indication of multipath reflection along a path of signal propagation from the GNSS satellite.

Clause 29: The computerized apparatus of clause 28, wherein the means for determining the first indication of signal strength associated with the first polarization type comprise a dedicated right-handed circularly polarized (RHCP) antenna, and the means for receiving the second indication of signal strength associated with the second polarization type comprise a dedicated left-handed circularly polarized (LHCP) antenna.

Clause 30: The computerized apparatus of any of clauses 28-29 further comprising means for receiving the one or more signals from the GNSS satellite, the means for receiving the one or more signals from the GNSS satellite comprising a first antenna configured to detect a signal component having a vertical polarization, and a second antenna configured to detect a signal component having a horizontal polarization; and means for combining the signal component having the vertical polarization and the signal component having the horizontal polarization to output a circularly polarized signal, the circularly polarized signal comprising a right-handed circularly polarized (RHCP) signal component and a left-handed circularly polarized (LHCP) signal component.

What is claimed is:

1. A method for multipath estimation at a mobile device, comprising:
   receiving, using one or more antennas at the mobile device, one or more signals from a Global Navigation Satellite System (GNSS) satellite, the one or more signals comprising a right-handed circularly polarized (RHCP) signal and a left-handed circularly polarized (LHCP) signal, wherein the RHCP signal and the LHCP signal are received over a single signal path from an antenna subsystem of the mobile device;

generating a first indication of signal strength from the RHCP signal;

generating a second indication of signal strength from the LHCP signal;

determining an amplification of the one or more signals received from the GNSS satellite based on the first indication and the second indication;

determining an indication of multipath reflection along a path of signal propagation between the GNSS satellite and the mobile device based on the first indication and the second indication; and mitigating the amplification, responsive to the determining of the amplification of the one or more signals, by adjusting activity of the antenna subsystem or a baseband subsystem of the mobile device in receiving at least one of the RHCP signal or the LHCP signal.

2. The method of claim 1, further comprising:

determining a utilization plan for signals associated with the GNSS satellite, based on the indication of multipath reflection between the GNSS satellite and the mobile device.

3. The method of claim 2, wherein the utilization plan comprises assigning a weight to signals or a position fix derived from signals from the GNSS satellite in estimating a position for the mobile device.

4. The method of claim 2, wherein the utilization plan comprises utilizing signals from the GNSS satellite for estimating a position for the mobile device.

5. The method of claim 2, wherein the utilization plan comprises utilizing signals based on communication protocols other than the GNSS satellite for estimating a position for the mobile device.

6. The method of claim 2, wherein the utilization plan is further applied to signals from one or more other GNSS satellites from one or more GNSS constellations.

7. The method of claim 1, wherein:

the RHCP signal and the LHCP signal are received as frequency-multiplexed signals or time-multiplexed signals, over the single signal path from the antenna subsystem.

8. The method of claim 1, further comprising:

controlling one or more switches to select, at a first time, the one or more signals received from the GNSS satellite and select, at a second time, one or more wide-area-network (WAN) signals received at the mobile device using the one or more antennas.

9. The method of claim 1, wherein:

the RHCP signal and the LHCP signal are received as digital data.

10. The method of claim 1, wherein the determining of the indication of multipath reflection is further based on a relative comparison between the first indication of signal strength and the second indication of signal strength.

11. The method of claim 10, wherein the determining of the indication of multipath reflection is further based on prior measurement data relating to the first indication of signal strength and the second indication of signal strength, the prior measurement data having been obtained by other mobile devices and being accessible to the mobile device.

12. The method of claim 1, further comprising determining a polarization profile based on the first indication of signal strength and the second indication of signal strength, the polarization profile comprising a relationship among the first indication of signal strength, the second indication of signal strength, a multipath characteristic associated with the one or more signals received from the GNSS satellite, and an environmental context.

13. The method of claim 12, further comprising determining, based at least on the polarization profile and the indication of multipath reflection, a presence of a signal spoofing source associated with the one or more signals received from the GNSS satellite.

14. A method for multipath estimation at a mobile device, comprising:

receiving one or more signals from a Global Navigation Satellite System (GNSS) satellite, the one or more signals including a first linearly polarized signal and a second linearly polarized signal, wherein the first linearly polarized signal is received over a first signal path and the second linearly polarized signal is received over a second signal path;

converting the first linearly polarized signal and the second linearly polarized signal to a right-handed circularly polarized (RHCP) signal and a left-handed circularly polarized (LHCP) signal;

generating a first indication of signal strength from the RHCP signal;

generating a second indication of signal strength from the LHCP signal;

determining, based on the first indication of signal strength and the second indication of signal strength, an indication of multipath reflection along a path of signal propagation between the GNSS satellite and the mobile device; and controlling one or more switches to select, at a first time, the one or more signals received from the GNSS satellite and select, at a second time, one or more wide-area-network (WAN) signals received at the mobile device using one or more antennas of the mobile device.

15. A user equipment comprising:

a baseband subsystem;

an antenna subsystem configured for signal communication with the baseband subsystem, the antenna subsystem comprising a first antenna, a second antenna, and a radio frequency (RF) coupler configured to receive signal inputs from the first antenna and the second antenna to output a right-handed circularly polarized (RHCP) signal component and a left-handed circularly polarized (LHCP) signal component having a second polarization type, wherein the RHCP signal and the LHCP signal are received over a single signal path from the antenna subsystem; and a processor, communicatively connected to the baseband subsystem, the processor configured to:

generate a first indication of signal strength associated with the RHCP signal component and derived from one or more signals received from a Global Navigation Satellite System (GNSSA satellite using the antenna subsystem;

generate a second indication of signal strength associated with the LHCP signal component and derived from the one or more signals received from the GNSS satellite using the antenna subsystem;

determine an amplification of the one or more signal received from the GNSS satellite based on the first indication and the second indication;

determine an indication of multipath reflection along a path of signal propagation between the GNSS satellite and the user equipment based on the first indication and the second indication; and mitigate the amplification, responsive to determining the amplification of the one or more signals, by adjusting activity of the antenna subsystem or the baseband subsystem in receiving signals of at least one of the RHCP signal component or the LHCP signal component.

16. The user equipment of claim 15, wherein the baseband subsystem comprises a first receiver and a second receiver, the first receiver configured to determine the first indication of signal strength, the second receiver configured to determine the second indication of signal strength.

17. The user equipment of claim 15, wherein:
the first antenna is configured to detect a signal component having a vertical polarization;
the second antenna is configured to detect a signal component having a horizontal polarization; and
the RF coupler is further configured to combine the signal component having the vertical polarization and the signal component having the horizontal polarization to output a circularly polarized signal, the circularly polarized signal comprising the RHCP signal component and the LHCP signal component.

18. The user equipment of claim 15, wherein the RHCP signal and the LHCP signal are received as frequency-multiplexed signals or time-multiplexed signals over the single signal path from the antenna subsystem.

19. The user equipment of claim 15, wherein the determination of the indication of multipath reflection is further based on a relative comparison between the first indication of signal strength and the second indication of signal strength.

20. A non-transitory computer-readable apparatus comprising a storage medium, the storage medium comprising a plurality of instructions to, when executed by a processor, cause a mobile device to:
receive, using one or more antennas at the mobile device, one or more signals from a Global Navigation Satellite System (GNSS) satellite, the one or more signals comprising a right-handed circularly polarized (RHCP) signal and a left-handed circularly polarized (LHCP) signal, wherein the RHCP signal and the LHCP signal are received over a single signal path from an antenna subsystem of the mobile device;
generate a first indication of signal strength from the RHCP signal;
generate a second indication of signal strength from the LHCP signal;
determine an amplification of the one or more signals received from the GNSS satellite based on the first indication and the second indication;
determine an indication of multipath reflection along a path of signal propagation between the GNSS satellite and the mobile device based on the first indication of signal strength and the second indication of signal strength; and
mitigate the amplification, responsive to determining the amplification of the one or more signals, by adjusting activity of the antenna subsystem or a baseband subsystem of the mobile device in receiving at least one of the RHCP signal or the LHCP signal.

21. The non-transitory computer-readable apparatus of claim 20, further comprising instructions to, when executed by the processor, cause the mobile device to:
receive the RHCP signal and the LHCP signal, as time-multiplexed signals or frequency-multiplexed signals, over the single signal path from the antenna subsystem.

22. The non-transitory computer-readable apparatus of claim 20, wherein the determination of the indication of multipath reflection is further based on a relative comparison between the first indication of signal strength and the second indication of signal strength.

23. A computerized apparatus comprising:
means for receiving one or more signals from a Global Navigation Satellite System (GNSS) satellite, the one or more signals comprising a right-handed circularly polarized (RHCP) signal and a left-handed circularly polarized (LHCP) signal, wherein the RHCP signal and the LHCP signal are received over a single signal path;
means for generating a first indication of signal strength from the RHCP signal;
means for generating a second indication of signal strength from the LHCP signal
means for determining an amplification of the one or more signals received from the GNSS satellite based on the first indication and the second indication;
means for, determining an indication of multipath reflection along a path of signal propagation from the GNSS satellite based on the first indication and the second indication; and
means for mitigating the amplification, responsive to the determining of the amplification of the one or more signals, by adjusting activity of an antenna subsystem means or a baseband subsystem means in receiving at least one of the RHCP signal or the LHCP signal.

24. The computerized apparatus of claim 23, wherein the means for determining the first indication of signal strength comprise a dedicated RHCP antenna, and the means for determining the second indication of signal strength comprise a dedicated LHCP antenna.

25. The computerized apparatus of claim 23, further comprising:
means for receiving the one or more signals from the GNSS satellite, the means for receiving the one or more signals from the GNSS satellite comprising a first antenna configured to detect a signal component having a vertical polarization, and a second antenna configured to detect a signal component having a horizontal polarization; and
means for combining the signal component having the vertical polarization and the signal component having the horizontal polarization to output a circularly polarized signal, the circularly polarized signal comprising the RHCP signal component and the LHCP signal component.

26. The method of claim 14, further comprising:
determining, based on the first indication of signal strength and the second indication of signal strength, an amplification of the one or more signals received from the GNSS satellite; and
responsive to the determining of the amplification of the one or more signals, mitigating the amplification by adjusting receipt of at least one of the RHCP signal or the LHCP signal.

* * * * *